(12) United States Patent
Sumida et al.

(10) Patent No.: US 6,913,638 B2
(45) Date of Patent: Jul. 5, 2005

(54) METHOD FOR SEPARATING HYDROGEN GAS

(75) Inventors: Toshihiko Sumida, Kako-gun (JP); Hiroaki Sasano, Kako-gun (JP); Masanori Miyake, Kako-gun (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

(21) Appl. No.: 10/451,698

(22) PCT Filed: Dec. 21, 2001

(86) PCT No.: PCT/JP01/11307
§ 371 (c)(1),
(2), (4) Date: Jun. 25, 2003

(87) PCT Pub. No.: WO02/051524
PCT Pub. Date: Jul. 4, 2002

(65) Prior Publication Data
US 2004/0025692 A1 Feb. 12, 2004

(30) Foreign Application Priority Data
Dec. 25, 2000 (JP) ........................... 2000-392918
Dec. 26, 2000 (JP) ........................... 2000-395023

(51) Int. Cl.[7] ................................................ B01D 53/047
(52) U.S. Cl. .................. 95/98; 95/100; 95/105; 95/139; 95/140
(58) Field of Search ........................ 95/96–98, 100, 95/103–105, 139, 140, 902; 96/130, 132, 143, 144

(56) References Cited

U.S. PATENT DOCUMENTS

| 3,986,849 | A | | 10/1976 | Fuderer et al. | |
|---|---|---|---|---|---|
| 4,404,004 | A | | 9/1983 | Knoblauch et al. | |
| 4,406,674 | A | | 9/1983 | Knoblauch et al. | |
| 4,461,630 | A | * | 7/1984 | Cassidy et al. | 95/100 |
| 4,755,361 | A | * | 7/1988 | Fuderer | 422/148 |
| 4,915,711 | A | | 4/1990 | Kumar | |
| 5,015,272 | A | | 5/1991 | Okada et al. | |
| 5,258,058 | A | * | 11/1993 | Coe et al. | 95/96 |
| 5,268,023 | A | * | 12/1993 | Kirner | 95/103 |
| 5,656,065 | A | * | 8/1997 | Kalbassi et al. | 95/96 |
| 5,912,422 | A | * | 6/1999 | Bomard et al. | 95/96 |
| 6,238,460 | B1 | * | 5/2001 | Deng et al. | 95/98 |
| 6,261,344 | B1 | * | 7/2001 | Labasque et al. | 95/96 |
| 6,340,382 | B1 | * | 1/2002 | Baksh et al. | 95/96 |
| 6,464,756 | B1 | * | 10/2002 | Plee | 95/96 |
| 6,471,748 | B1 | * | 10/2002 | Ackley | 95/96 |
| 2001/0045160 | A1 | * | 11/2001 | Hirano et al. | 95/96 |
| 2002/0014153 | A1 | * | 2/2002 | Baksh et al. | 95/96 |
| 2003/0172808 | A1 | * | 9/2003 | Le Bec | 95/96 |

FOREIGN PATENT DOCUMENTS

| EP | 0 590 615 A1 | 9/1993 |
|---|---|---|
| EP | 0 612 552 A1 | 2/1994 |
| EP | 0 855 209 A1 | 1/1998 |
| EP | 0 305 663 A1 | 6/1998 |
| EP | 0 982 063 | 3/2000 |
| GB | 1241065 | 8/1968 |
| JP | 62-38014 | 8/1987 |
| JP | 64-063019 | 3/1989 |
| JP | 8-010551 | 1/1996 |
| JP | 10-212103 | 8/1998 |
| JP | 2000-61239 | 2/2000 |
| JP | 2000-140549 | 5/2000 |
| JP | 2000-313605 | 11/2000 |

* cited by examiner

*Primary Examiner*—Robert H. Spitzer
(74) *Attorney, Agent, or Firm*—Hamre, Schumann, Mueller & Larson, P.C.

(57) ABSTRACT

Product gas (Gpro) is separated from material gas (Gmat) by a PSA process utilizing a plurality of adsorption towers (A–C) each loaded with an adsorbent. The separation of the product gas (Gpro) is performed by repeating a cycle comprising an adsorption step, a decompression step, a desorption step, a cleaning step and a pressurization step. In the decompression step, remaining gas (Grem) as cleaning gas is introduced from one adsorption tower (C) to another adsorption tower (B). The amount of the remaining gas (Grem) introduced is 2 to 7 times the volume of the adsorbent loaded in the adsorption tower (B) as converted into volume at common temperature and under atmospheric pressure. To remove both of carbon monoxide and carbon dioxide from the material gas (Gmat) by a single kind of adsorbent, use is made of zeolite having a faujasite structure with a Si/Al ratio lying in a range of 1 to 1.5 and a lithium-exchange ratio of no less than 95%.

8 Claims, 15 Drawing Sheets

FIG.2

|   | S1 | S2 | S3 | S4 | S5 | S6 |
|---|---|---|---|---|---|---|
| A | 1st Ad. | 2nd Ad. | Decomp. | Desorp. | Cl. | Pres. |
| B | Cl. | Pres. | 1st Ad. | 2nd Ad. | Decomp. | Desorp. |
| C | Decomp. | Desorp. | Cl. | Pres. | 1st Ad. | 2nd Ad. |
| Va | ○ | ○ | × | × | × | × |
| Vb | × | × | × | ○ | ○ | × |
| Vc | × | × | ○ | ○ | × | × |
| Vd | ○ | × | × | × | × | ○ |
| Ve | × | × | × | × | ○ | ○ |
| Vf | × | ○ | ○ | × | × | × |
| Vg | × | × | × | × | ○ | ○ |
| Vh | × | × | ○ | × | × | × |
| Vi | ○ | ○ | × | × | × | × |
| Vj | ○ | ○ | × | × | × | × |
| Vk | × | × | × | × | ○ | × |
| Vl | × | × | ○ | ○ | × | × |
| Vm | × | × | ○ | ○ | × | × |
| Vn | ○ | × | × | × | × | × |
| Vo | × | × | × | × | ○ | ○ |
| Vp | × | ○ | × | ○ | × | ○ |

| | S1 | AS1' | S2 | S3 | AS3' | S4 | S5 | AS5' | S6 |
|---|---|---|---|---|---|---|---|---|---|
| A | 1st Ad. | 2nd Ad. | 3rd Ad. | Decomp. | 1st Desorp. | 2nd Desorp. | 1st Cl. | 2nd Cl. | Pres. |
| B | 1st Cl. | 2nd Cl. | Pres. | 1st Ad. | 2nd Ad. | 3rd Ad. | Decomp. | 1st Desorp. | 2nd Desorp. |
| C | Decomp. | 1st Desorp. | 2nd Desorp. | 1st Cl. | 2nd Cl. | Pres. | 1st Ad. | 2nd Ad. | 3rd Ad. |
| Va | O | O | × | × | × | × | × | × | × |
| Vb | × | × | × | × | O | O | O | O | × |
| Vc | × | × | × | O | O | O | × | × | × |
| Vd | O | O | × | × | × | × | × | O | O |
| Ve | × | × | × | O | × | × | O | O | O |
| Vf | × | O | O | × | × | × | × | × | × |
| Vg | × | × | × | O | × | × | × | × | O |
| Vh | × | × | O | × | × | × | × | × | × |
| Vi | O | O | O | × | × | × | × | × | × |
| Vj | O | × | × | × | O | O | O | × | × |
| Vk | × | × | × | O | O | O | × | × | × |
| Vl | × | × | × | × | × | × | O | × | × |
| Vm | × | × | × | × | × | O | × | × | × |
| Vn | O | × | × | × | × | × | × | × | × |
| Vo | × | × | × | × | O | O | O | O | O |
| Vp | × | O | O | × | O | O | × | O | O |

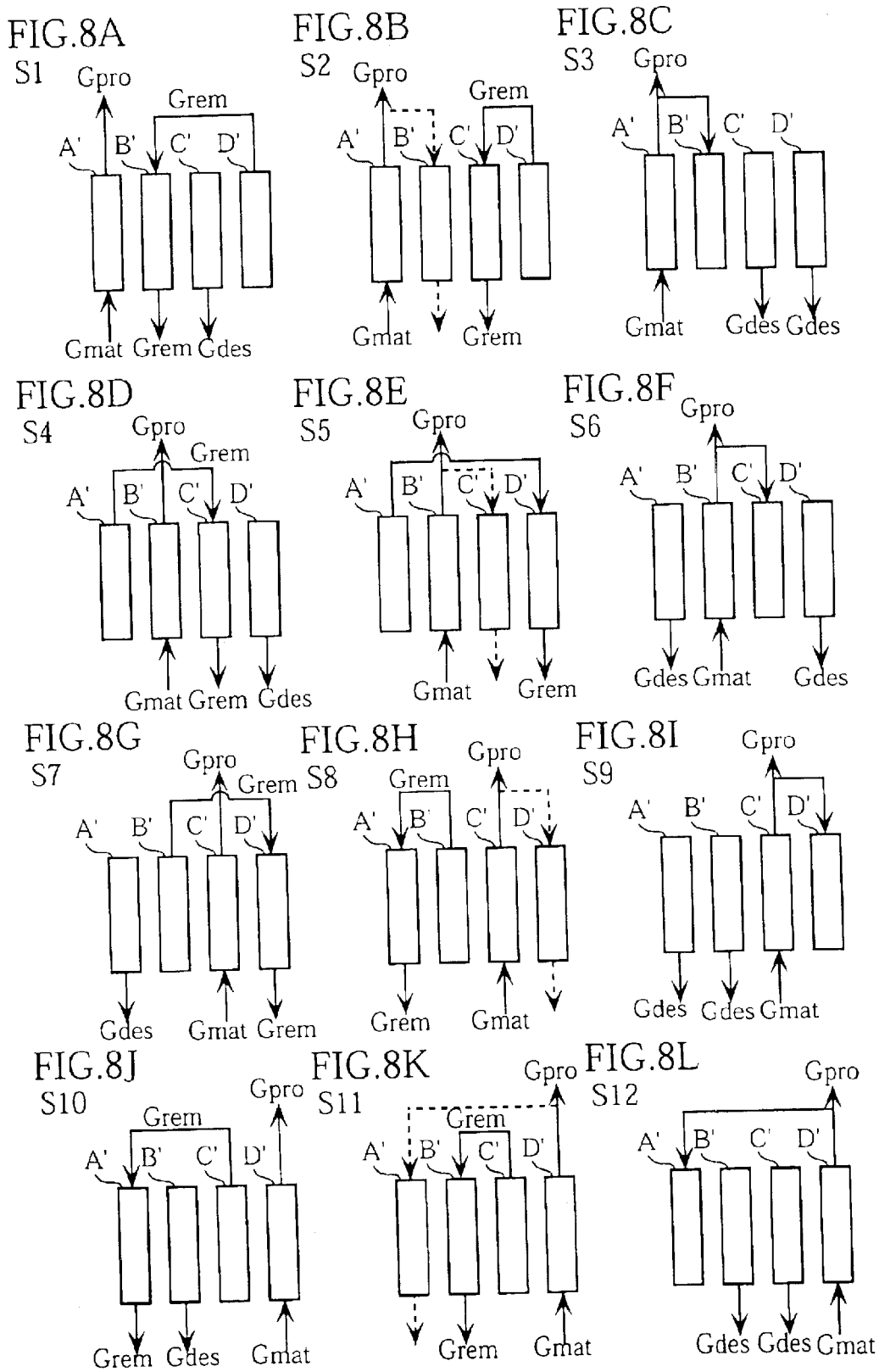

FIG.9

|   | S1 | S2 | S3 | S4 | S5 | S6 | S7 | S8 | S9 |
|---|---|---|---|---|---|---|---|---|---|
| A | 2nd Ad. | 3rd Ad. | 1st PE (Decomp.) | Desorp. | Cl. | 2nd PE (Pres.) / 1st PE (Decomp.) | 1st Pres. | 2nd Pres. | 1st Ad. / 2nd PE (Pres.) / 1st PE (Decomp.) |
| B | 1st Pres. | 2nd Pres. | 1st Ad. | 2nd Ad. | 3rd Ad. | | Desorp. | Cl. | |
| C | Desorp. | Cl. | 2nd PE (Pres.) | 1st Pres. | 2nd Pres. | 1st Ad. | 2nd Ad. | 3rd Ad. | |
| Va | O | O | × | × | × | × | × | × | O |
| Vb | × | × | × | O | O | × | × | × | × |
| Vc | × | × | O | O | O | × | × | × | × |
| Vd | × | × | × | × | × | × | O | O | × |
| Ve | × | O | × | × | × | O | O | O | × |
| Vf | O | × | × | × | O | × | × | × | × |
| Vg | × | × | O | × | × | O | × | × | × |
| Vh | × | O | × | × | × | × | × | × | O |
| Vi | O | O | × | O | O | × | × | O | O |
| Vj | O | × | O | O | × | × | × | × | × |
| Vk | × | × | O | × | O | O | × | O | × |
| Vl | × | O | O | × | O | × | × | × | × |
| Vm | × | × | × | × | × | × | × | × | × |
| Vn | × | × | × | × | O | O | O | O | O |
| Vo | × | O | × | O | × | × | O | O | × |
| Vp | O | O | × | O | O | × | O | O | × |

S1

S2

S3

S4

S5

S6

S7

S8

S9

FIG.12A S1 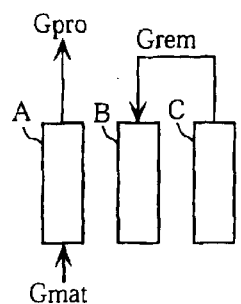
FIG.12B S2 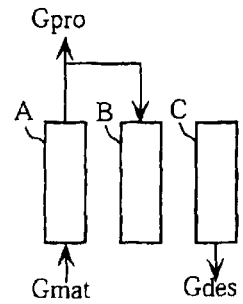
FIG.12C S3 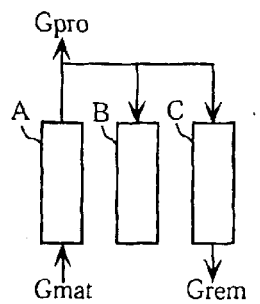
FIG.12D S4 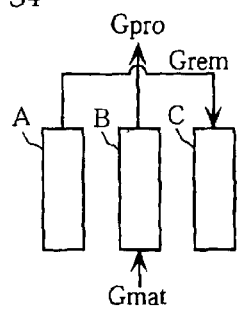
FIG.12E S5 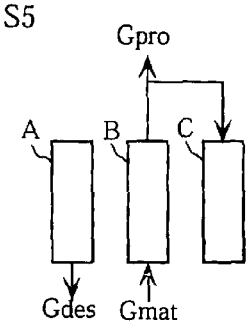
FIG.12F S6 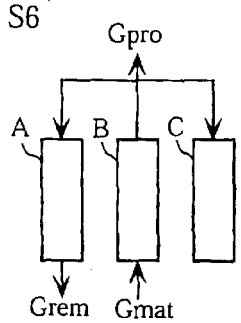
FIG.12G S7 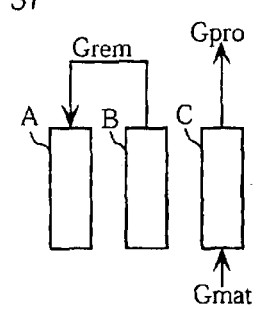
FIG.12H S8 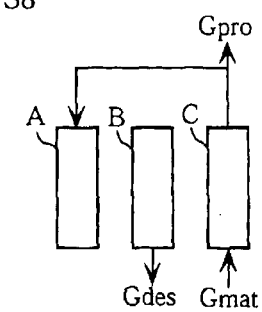
FIG.12I S9 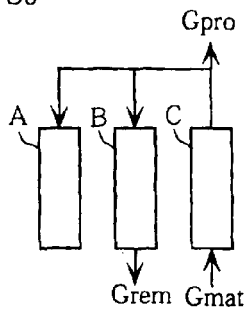

|   | S1 | S2 | S3 | S4 | S5 | S6 | S7 | S8 | S9 |
|---|---|---|---|---|---|---|---|---|---|
| A | Ad. | Ad. | Ad. | PE | Des. | Cl. | PE | Pres. | Pres. |
| B | PE | Pres. | Pres. | Ad. | Ad. | Ad. | PE | Des. | Cl. |
| C | PE | Des. | Cl. | PE | Pres. | Pres. | Ad. | Ad. | Ad. |
| V.O. | 5A,8A 6B 7C 6c | 5A,8A 6B 9C 6a | 5A,8A 6B 7C,9C 6a,6b | 7A 5B,8B 6C 6c | 9A 5B,8B 6C 6a | 7A,9A 5B,8B 6C 6a,6b | 6A 7B 5C,8C 6c | 6A 9B 5C,8C 6a | 6A 7B,9B 5C,8C 6a,6b |

METHOD FOR SEPARATING HYDROGEN GAS

TECHNICAL FIELD

The present invention relates to a gas separation method utilizing pressure swing adsorption.

BACKGROUND ART

Various methods for separating target gas (product gas) from material gas are known, and pressure swing adsorption (PSA) is one of such methods. Since a PSA process can be performed easily at a relatively low cost, it is widely utilized in the related field. The PSA process typically utilizes a plurality of adsorption towers loaded with an adsorbent. After material gas is introduced in each of the adsorption towers, the process steps of adsorption, decompression, desorption and pressurization are repeated to obtain a targeted product gas.

Specifically, the target gas is obtained on a principle described below. When the pressure of material gas introduced in the adsorption tower is increased, the partial pressure of an unnecessary gas component contained in the material gas also increases. As a result, the unnecessary gas component is adsorbed by the adsorbent loaded in the adsorption tower. (That is, the unnecessary gas component is removed from the material gas.) In this state, the gas in the adsorption tower is discharged as target gas (product gas) containing little amount of unnecessary gas. Thereafter, as the pressure in the adsorption tower drops, the unnecessary gas component is desorbed from the adsorbent (regeneration of the adsorbent) The desorbed component together with other components remaining in the tower are then discharged from the tower. The regenerated adsorbent can be utilized for removing an unnecessary gas component from newly introduced material gas for obtaining an additional amount of target gas. Examples of target gases include hydrogen gas, oxygen gas and nitrogen gas and the like.

The kind of adsorbent to be used in each of the adsorbent towers is selected based on the kind of a target gas and the kind of an unnecessary gas component to be removed. For example, zeolite is conventionally used as the adsorbent for removing nitrogen component and carbon monoxide component from material gas for obtaining hydrogen gas as a product gas. On the other hand, an activated carbon-based adsorbent is used for removing carbon dioxide component from material gas.

For the PSA process, various improvements have been made for enhancing the purity of the obtained target gas and the yield. These improvements are disclosed in the gazettes of JP-B2-62(1987)-38014, JP-B2-7(1995)-4498 and JP-A-8(1996)-10551.

As one of the improvements for the PSA process, a technique is developed for increasing the regeneration efficiency of an adsorbent. Specifically, it is now assumed that a desorption step is finished in one adsorption tower (first adsorption tower) while an adsorption step is being performed in another adsorption tower (second adsorption tower). At that time, product gas is introduced from the second adsorption tower to the first adsorption tower. As a result, the gas remaining in the first adsorption tower is discharged, i.e. the first adsorption tower can be cleaned (cleaning step). Such cleaning can increase the regeneration efficiency of the adsorbent loaded in the adsorption tower, which may result in an increase in the yield of the hydrogen gas.

Another improvement for the PSA process is as follows. It is now assumed that an adsorption step is finished in a first adsorption tower and the internal pressure of the adsorption tower is high, while a desorption step (or cleaning step) is finished in a second adsorption tower and the internal pressure of the adsorption tower is low. In this state, the remaining gas is introduced from the first adsorption tower (at high pressure) to the second adsorption tower (at low pressure) for equalizing the internal pressures of the two adsorption towers. This technique is advantageous in that decompression of the first adsorption tower and pressurization of the second adsorption tower can be performed easily at the same time.

The PSA process improved as described above can be performed using a separation apparatus X as shown in FIG. 1. The separation apparatus X includes three adsorption towers A–C, a material gas pipe 1, a product gas pipe 2, a remaining gas outlet pipe 3, a remaining gas inlet pipe 4, a product purge pipe 5 and a discharge pipe 6. The pipes 1–6 are provided with automatic valves a–p. The remaining gas outlet pipe 3 and the product purge pipe 5 are provided with flow rate controlling valves 7 and 8, respectively. The above-described five process steps (adsorption, decompression, desorption, pressurization and cleaning) are performed in each of the adsorption towers A–C by selectively opening or closing the automatic valves a–p.

As shown in FIG. 9, the five process steps are performed in the respective adsorption towers A–C at different timings. In the example shown in FIG. 9, nine process steps are defined. For example, in a first step (S1), an adsorption step (second adsorption step) is performed in the adsorption tower A, a pressurization step (first pressurization step) is performed in the adsorption tower B, and a desorption step is performed in the adsorption tower C. At that time, each of the automatic valves (Va–Vp) is open (o) or closed (x).

The gas flow in the separation apparatus X varies in each process step. FIGS. 10A–10I illustrate variations of the gas flow. Specifically, as shown in FIG. 10A, in the first step (S1), material gas is introduced into the adsorption tower A through the material gas pipe 1 and the automatic valve a. In the adsorption tower A, unnecessary gas components are removed by the adsorbent and product gas is discharged from the tower. The product gas is partially collected through the automatic valve i and the product gas pipe 2 while partially introduced into the adsorption tower B through the product purge pipe 5, the automatic valve p, the flow rate controlling valve 8, the remaining gas inlet pipe 4 and the automatic valve j. As a result, pressure in the adsorption tower B is raised. The amount of product gas introduced in the adsorption tower B is controlled by the flow rate controlling valve 8. From the adsorption tower C, the gas remaining in the tower is discharged through the automatic valve f and the discharge pipe 6.

In the second step (S2), an adsorption step (third adsorption step), a pressurization step (second pressurization step) and a cleaning step are performed in the adsorption towers A, B and C, respectively. Specifically, as shown in FIG. 10B, the adsorption step is performed in the adsorption tower A subsequent to the introduction of material gas. The product gas thus obtained is discharged from the adsorption tower A. The discharged product gas is partially collected while partially introduced into the adsorption towers B and C. The pressure in the adsorption tower B is raised by the introduction of the product gas. The product gas is introduced into the adsorption tower C through the product purge pipe 5, the automatic valve p, the flow rate controlling valve 8, the remaining gas inlet pipe 4 and the automatic valve m. As a result, remaining gas is discharged from the adsorption tower C. At that time, it is preferable that the product gas introduced into the adsorption tower C is not discharged and only the remaining gas is discharged. This is based on the recognition that the collection of product gas is difficult once the product gas is discharged from the tower. In a prior art method, therefore, the amount of product gas introduced into the adsorption tower C is set to be smaller than the volume of the adsorbent loaded in the adsorption tower C (as converted into volume at common temperature and under atmospheric pressure).

In the third step (S3), a decompression step (first pressure equalization step), an adsorption step (first adsorption step) and a pressurization step (second pressure equalization step) are performed in the adsorption tower A, B, and C, respectively. Specifically, as shown in FIG. 10C, remaining gas discharged from the adsorption tower A is introduced into the adsorption tower C through the automatic valve h, the remaining gas outlet pipe 3, the flow rate controlling valve 7, the remaining gas inlet pipe 4 and the automatic valve m. As a result, the decompression for the adsorption tower A and the pressurization for the adsorption tower C are performed at the same time. Material gas is introduced into the adsorption tower B through the material gas pipe 1 and the automatic valve c. The adsorbent loaded in the adsorption tower B removes unnecessary gas components from the material gas for providing product gas. The product gas is discharged from the adsorption tower B and then collected through the automatic valve 1 and the product gas pipe 2.

In the fourth through the sixth steps (S4–S6), process steps described below are performed in each of the adsorption towers. In the adsorption tower A, a desorption step, a cleaning step and a pressurization step (second pressure equalization step) are performed. These process steps are similar to those performed in the adsorption tower C in the first through the third steps. In the adsorption tower B, an adsorption step (second adsorption step), an adsorption step (third adsorption step) and a decompression step (first pressure equalization step) are performed. These process steps are similar to those performed in the adsorption tower A in the first through the third steps. In the adsorption tower C, a pressurization step (first pressurization step), a pressurization step (second pressurization step) and an adsorption step (first adsorption step) are performed. These process steps are similar to those performed in the adsorption tower B in the first through the third steps.

In the seventh through the ninth steps, the process steps described below are performed in each of the adsorption towers. In the adsorption tower A, a pressurization step (first pressurization step), a pressurization step (second pressurization step) and an adsorption step (first adsorption step) are performed. These process steps are similar to those performed in the adsorption tower B in the first through the third steps. In the adsorption tower B, a desorption step, a cleaning step and a pressurization step (second pressure equalization step) are performed. These process steps are similar to those performed in the adsorption tower C in the first through the third steps. In the adsorption tower C, an adsorption step (second adsorption step), an adsorption step (third adsorption step) and a decompression step (first pressure equalization step) are performed. These process steps are similar to those performed in the adsorption tower A in the first through the third steps.

By repetitively performing the above-described first through ninth steps in each of the adsorption towers A–C, unnecessary gas components are removed from the material gas, thereby providing product gas containing a high concentration of hydrogen.

As described above, in the prior art PSA process, product gas is introduced from an adsorption tower (e.g. the adsorption tower A in the second step) in which adsorption is being performed to another adsorption tower (the adsorption tower C in the second step) in which desorption is finished for cleaning this adsorption tower. To avoid wasteful discharging of product gas, the amount of product gas introduced is set to be smaller than the volume of the loaded adsorbent. Further, in the prior art process, for efficiently utilizing high-pressure gas in an adsorption tower, internal pressure equalization is performed between an adsorption tower in which adsorption is finished (e.g. the adsorption tower A in the third step) and an adsorption tower in which adsorption is to be performed (the adsorption tower C in the third step).

Various improvements have been proposed also for adsorbents for the PSA process. For example, JP-A-10(1998)-212103 discloses zeolite having high adsorptivity for nitrogen gas and carbon monoxide gas for removing these gas components from material gas. The zeolite has a faujasite structure with a Si/Al ratio lying in the range of 1 to 3 and with a lithium-exchange ratio of no less than 70%.

As described above, the prior art PSA process has been improved in various ways. However, in spite of such improvements, the conventional PSA process still has the following problems to be solved.

The first problem relates to the yield of target gas. Conventionally, as described above, each of adsorption towers is cleaned using product gas for the purpose of enhancing the regeneration efficiency of the adsorbent and the yield of target gas. Actually, however, it is found that the yield is not increased as much as expected.

The second problem is caused by the pressure equalization step between two adsorption towers. As described above, by introducing remaining gas from an adsorption tower on the high pressure side to an adsorption tower on the low pressure side, target gas included in remaining gas can be collected. However, the remaining gas contains not only the target gas but also unnecessary gas components. Therefore, part of the unnecessary gas components adsorbs to the adsorbent in the adsorption tower to which the remaining gas is introduced, so that the adsorbent cannot exhibit as much adsorption effect as expected.

The third problem is an increase in size of the apparatus due to the use of a plurality of adsorbents. As the material gas for the PSA process, use may be made of mixed gas obtained by steam-reforming hydrocarbon (methanol or natural gas), for example. For example, in the case of reforming methanol, the composition of the mixed gas is about 75% hydrogen gas, about 24% carbon dioxide gas and about 1% carbon monoxide gas. To obtain high purity hydrogen gas (target gas) from such mixed gas, both of carbon dioxide component and carbon monoxide component need be removed. As described above, in the prior art PSA process, zeolite is used as the adsorbent for removing carbon monoxide component, whereas activated carbon-based adsorbent is used for removing carbon dioxide component. Therefore, to remove both carbon dioxide component and carbon monoxide component, the two kinds of adsorbents need be loaded in each of the adsorption towers. To load the plural kinds of adsorbents, adsorption towers of large capacity need be used, which disadvantageously increase the size of the entire separation apparatus.

The reason why two kinds of adsorbents are needed for removing carbon dioxide and carbon monoxide is as follows.

As described above, the PSA process is a gas separation method which utilizes the fact that the amount of an unnecessary gas component adsorbed varies in accordance with the pressure variation in the adsorption tower. Therefore, to effectively remove an unnecessary gas component in the PSA process, a condition need be satisfied that the unnecessary gas component is likely to be adsorbed by the adsorbent under high pressure while it is unlikely to be adsorbed (i.e. is likely to be desorbed) under low pressure. However, when a prior art zeolite-based adsorbent is used for carbon dioxide, this condition is not satisfied. This point will be described below in detail with reference to FIG. 17.

The graph in FIG. 17 shows how adsorption isotherms (25° C.) for carbon dioxide gas become when three kinds of adsorbents (a 85% Li-exchanged zeolite, a Ca-exchanged A-type zeolite and a carbon-based adsorbent) are used. The signs "Li85Z", "CaAZ" and "Car." in the figure indicate the 85% Li-exchange zeolite, the Ca-exchange A-type zeolite and the carbon-based adsorbent, respectively. The 85% Li-exchange zeolite has a faujasite structure, a Si/Al ratio of 1 and a lithium-exchange ratio of 85%. In the graph of FIG. 17, the abscissa is adsorption equilibrium pressure (A.E.P.), whereas the ordinate is adsorbed amount of carbon dioxide ($CO_2$ Ad.)

The following is understood from the graph. As the equilibrium adsorption pressure increases, the amount of carbon dioxide adsorbed by the carbon-based adsorbent increases generally linearly. On the other hand, in the case of 85% Li-exchange zeolite and Ca-exchange A-type zeolite, the adsorbed amount of carbon dioxide rapidly increases initially but becomes generally constant when a certain value is exceeded. Specifically, in the case of 85% Li-exchange zeolite, the increasing rate of the adsorbed amount becomes small from when the equilibrium adsorption pressure exceeds approximately 1000 Torr. In the case of Ca-exchange A-type zeolite, the increasing rate of the adsorbed amount becomes small from when the equilibrium adsorption pressure exceeds approximately 750 Torr.

From the above, it is understood that the 85% Li-exchange zeolite and the Ca-exchange A-type zeolite are not suitable for removing carbon dioxide component in the PSA process, although the carbon-based adsorbent is effective for the removal. This point will be described using, as an example, a mixed gas containing about 75% hydrogen gas, about 24% carbon dioxide gas and about 1% carbon monoxide gas. For example, when the adsorption pressure for the mixed gas is set to 0.8 MPa and the desorption pressure for the gas is set to 1/8 (approximately equal to atmospheric pressure) of the adsorption pressure, the partial pressure of carbon dioxide gas contained in the mixed gas becomes about 0.192 MPa (1440 Torr) during adsorption and about 0.024 MPa (180 Torr) during desorption. As will be understood from the graph of FIG. 17, in the case where the carbon-based adsorbent is used, the adsorbed amount is 66 ml/g when the partial pressure of carbon dioxide gas is 1440 Torr whereas the adsorption amount is 18 ml/g when the partial pressure is 180 Torr. This indicates that 48(=66–18) ml/g of carbon dioxide gas is removed by varying the partial pressure of carbon dioxide gas in the range of 180 to 1440 Torr.

In the case where the Ca-exchange A-type zeolite is used, the adsorbed amount is 85 ml/g when the partial pressure of carbon dioxide gas is 1440 Torr whereas the adsorbed amount is 48 ml/g when the partial pressure is 180 Torr. Therefore, the amount of carbon dioxide gas removed is 37(=85–48) ml/g. In the case where the 85% Li-exchange zeolite is used, the adsorbed amount is 119 ml/g when the partial pressure of carbon dioxide gas is 1440 Torr whereas the adsorbent amount is 82 ml/g when the partial pressure is 180 Torr. Therefore, the amount of carbon dioxide gas removed is 37(=119–82)ml/g.

In this way, a larger amount of carbon dioxide gas can be removed by the carbon-based adsorbent than by the zeolite-based adsorbent. Conventionally, therefore, a zeolite-based adsorbent has been considered to be unsuitable for the removal of carbon dioxide component in the PSA process.

DISCLOSURE OF THE INVENTION

The present invention is conceived under the circumstances described above. Therefore, an object of the present invention is to enhance the yield of target gas by improving the steps performed in the PSA process.

Another object of the present invention is to provide an adsorbent capable of removing both a carbon dioxide component and a carbon monoxide component.

According to a first aspect of the present invention, there is provided a method for separating hydrogen gas from material gas. This method utilizes a plurality of adsorption towers each of which is loaded with an adsorbent and is provided with a product gas outlet. According to the method, one cycle comprising an adsorption step, a decompression step, a desorption step, a cleaning step and a pressurization step is repetitively performed. Specifically, in the adsorption step, an unnecessary gas component contained in the material gas is adsorbed by the adsorbent for outputting hydrogen-rich product gas through the product gas outlet. In the decompression step, pressure in an adsorption tower is reduced. In the desorption step, the unnecessary component is desorbed from the adsorbent. In the cleaning step, the adsorption tower is cleaned by introducing cleaning gas into the adsorption tower. In the pressurizing step, pressure in the adsorption tower is raised.

The decompression step includes introducing gas remaining in the adsorption tower into a selected adsorption tower as cleaning gas. The remaining gas is introduced in an amount 2 to 7 times the volume of the adsorbent loaded in the selected adsorption tower as converted into volume at common temperature and under atmospheric pressure.

As described above, product gas is utilized as cleaning gas in the prior art method. When remaining gas is introduced as cleaning gas in an amount 2 to 7 times the volume of the loaded adsorbent as is in the present invention, target gas can be efficiently recovered.

Preferably, the cleaning step includes an additional cleaning step performed by introducing product gas obtained from an adsorption tower undergoing an adsorption step as cleaning gas. The target gas can be recovered more efficiently by performing such an additional cleaning with product gas after the above-described cleaning with remaining gas.

Preferably, the cleaning step in the one cycle includes a first cleaning step and a second cleaning step performed after the first cleaning step, and the decompression step in the one cycle includes a first decompression step and a second decompression step performed after the first decompression step. The first and the second decompression steps are performed by discharging remaining gas through the product gas outlet.

Preferably, the first cleaning step in a first adsorption tower is performed by introducing therein remaining gas discharged from a second adsorption tower during the second decompression step through the product gas outlet of the first adsorption tower as cleaning gas, and the second cleaning step in the first adsorption tower is performed by introducing therein remaining gas discharged from a third adsorption tower during the first decompression step through the product gas outlet of the first adsorption tower as cleaning gas.

Preferably, in addition to the first and the second cleaning steps, a third cleaning step is performed by introducing product gas obtained from an adsorption tower undergoing an adsorption step as cleaning gas.

Preferably, in the one cycle, the decompression step, the desorption step, the first cleaning step, the desorption step, the second cleaning step and the third cleaning step are performed in the mentioned order in each of the adsorption towers.

Preferably, the maximum pressure in the adsorption step lies in a range of 0.2 to 3.6 MPa (absolute pressure), whereas the minimum pressure in the desorption step lies in a range of atmospheric pressure to 0.15 MPa (absolute pressure).

The material gas may contain carbon dioxide gas as the unnecessary gas component, for example.

According to a second aspect of the present invention, there is provided a method for removing at least carbon dioxide gas from material gas to obtain target gas. The method includes an adsorption step and a desorption step. In the adsorption step, the material gas is introduced into an adsorption tower loaded with an adsorbent for removing an unnecessary gas component including carbon dioxide by the adsorbent. In the desorption step, pressure in the adsorption tower is reduced to separate the unnecessary gas component from the adsorbent. The adsorption step and the desorption step constitute one cycle, which is repetitively performed. The minimum pressure in the desorption step is set to be approximately equal to atmospheric pressure. As the adsorbent, use may be made of zeolite having a faujasite structure with a Si/Al ratio lying in a range of 1 to 1.5 and a lithium-exchange ratio of no less than 95%.

Preferably, the maximum pressure in the adsorption step lies in a range of 0.5 to 4 MPa (absolute pressure).

Preferably, the material gas is a gas obtained by steam-reforming a hydrocarbon-based compound and contains carbon dioxide gas and hydrogen gas.

Further, the gas obtained by steam-reforming contains carbon monoxide, and the material gas may be that obtained after the content of the carbon monoxide is reduced by conversion.

According to a third aspect of the present invention, there is provided a gas separation apparatus comprising at least one adsorption tower and an adsorbent loaded in the adsorption tower. Material gas containing carbon dioxide gas is introduced into the adsorption tower. The adsorbent removes unnecessary gas (including carbon dioxide) from the material gas. As the adsorbent, use may be made of zeolite having a faujasite structure with a Si/Al ratio lying in a range of 1 to 1.5 and a lithium-exchange ratio of no less than 95%.

BRIEF DESCRIPTION OF THE DRAWINGS

FIG. 2 is a table showing process steps performed in a separation method according to a first embodiment of the present invention.

FIG. 4 is a table showing process steps performed in a separation method according to a second embodiment of the present invention.

FIG. 7 is a table showing process steps performed in the separation method of the third embodiment.

FIGS. 8A–8L illustrate gas flows in performing the separation method of the third embodiment.

FIG. 9 is a table showing process steps performed in a prior art separation method.

FIGS. 12A–12I illustrate gas flows in the separation apparatus of FIG. 11.

BEST MODE FOR CARRYING OUT THE INVENTION

Preferred embodiments of the present invention will be described below in detail with reference to the accompanying drawings.

Figure 1:
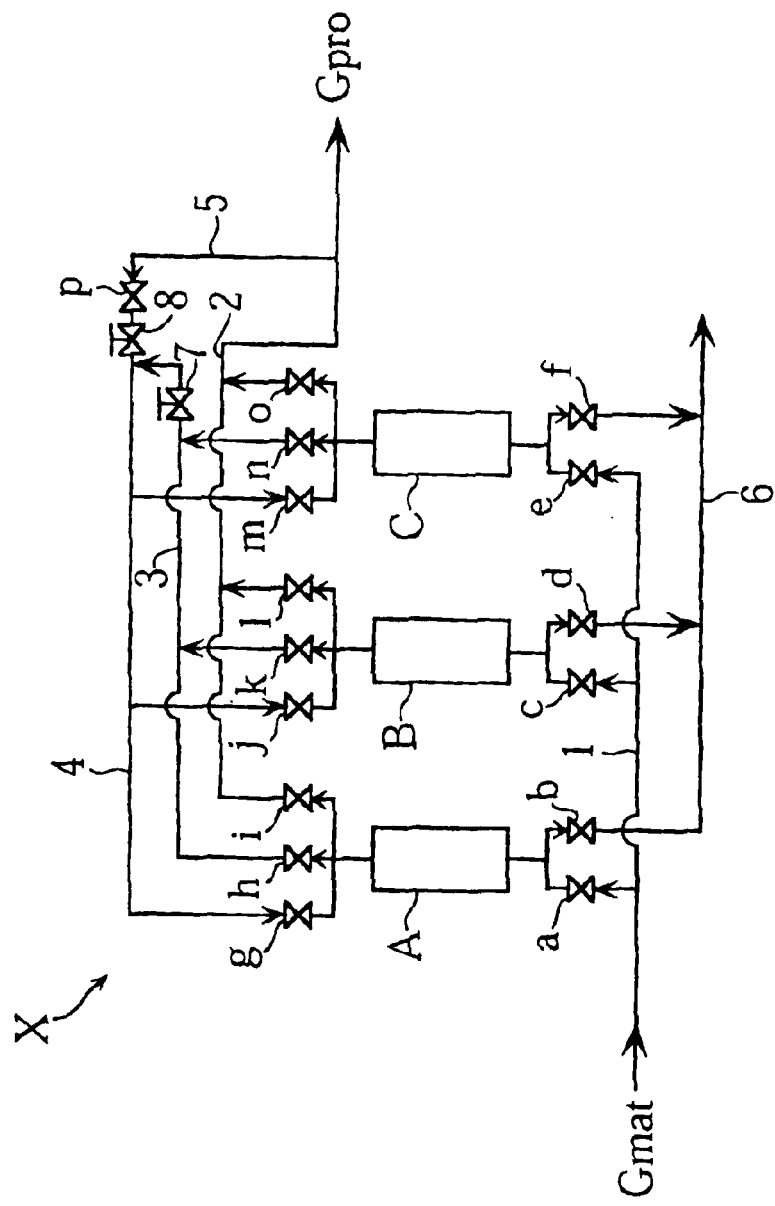
FIG. 1 schematically illustrates a PSA separation apparatus including three adsorption towers.

FIG. 1 illustrates a PSA separation apparatus X used for embodying a hydrogen gas separation method according to a first embodiment of the present invention. The PSA separation apparatus X includes three adsorption towers A, B and C. A material gas is introduced into each of the adsorption towers A–C. As the material gas, use may be used of gas containing about 75% hydrogen gas, about 20% carbon dioxide gas and about 1% carbon monoxide gas by volume ratio, for example. (The material gas further contains nitrogen gas and methane gas, for example.) Each of the adsorption towers A–C is loaded with an adsorbent for removing an unnecessary gas component from the material gas.

As will be understood from the description given below, the hydrogen gas separation method according to the first embodiment makes it possible to recover a higher yield of target gas (hydrogen gas) than a prior art method by innovating the process steps in the PSA process. Therefore, an adsorbent of the kind used in the prior art method may be used for loading in each of the adsorption towers A–C. Specifically, to remove only carbon dioxide and methane gas from the material gas, an activated carbon-based adsorbent may be used. To remove carbon monoxide and nitrogen gas only, a zeolite-based adsorbent may be used. To remove water vapor, alumina may be used, for example. To remove both carbon dioxide and carbon monoxide from the material gas, both of activated carbon-based adsorbent and zeolite may be used. In this case, however, the size of the entire separation apparatus becomes large as pointed out as a problem of the prior art method. This problem can be avoided by using zeolite having a novel structure provided according to the present invention (which will be described later.)

The PSA separation apparatus X further includes a material gas pipe 1, a product gas pipe 2, a remaining gas outlet pipe 3, a remaining gas inlet pipe 4, a product purge pipe 5 and a discharge pipe 6. In FIG. 1, the sign "Gmat" indicates material gas, whereas the sign "Gpro" indicates product gas. The pipes 1–6 are provided with automatic valves a–p. The remaining gas outlet pipe 3 and the product purge pipe 5 are provided with flow rate controlling valves 7 and 8, respectively.

An adsorption step, a decompression step, a desorption step, a cleaning step and a pressurization step are performed in each of the adsorption towers A–C by selectively opening or closing the automatic valves a–p. Specifically, as shown in FIG. 2, six steps (S1–S6) are performed in each of the adsorption towers A–C. In this figure, the sign "Ad." indicates an adsorption step, the sign "Decomp." indicates a decompression step, the sign "Desorp." indicates a desorption step, the sign "Cl." indicates a cleaning step, and the sign "Pres." indicates a pressurization step. For example, in the first step (S1), a first adsorption step (1st Ad.) is performed in the adsorption tower A, a cleaning step (Cl.) is performed in the adsorption tower B, and a decompression step (Decomp.) is performed in the adsorption tower C. At that time, the automatic valves a(Va), d(Vd), i(Vi), j(Vj) and n(Vn) are open (o), whereas other automatic valves are closed (x).

Figure 3A:
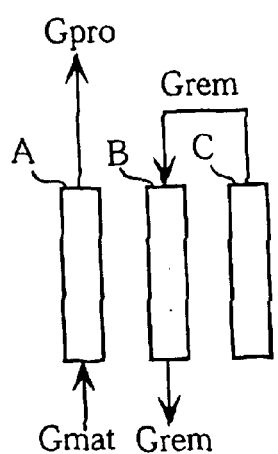
FIGS. 3A–3F illustrate gas flows in performing the separation method of the first embodiment.

FIGS. 3A–3F illustrate gas flow in the separation apparatus X in the first through the sixth steps. The illustrated six steps constitute one cycle (hereinafter referred to as "current cycle") which the separation apparatus X performs in the steady operation. The current cycle is performed following the immediately preceding cycle (hereinafter referred to as "previous cycle"). That is, the first step shown in FIG. 3A is performed after the sixth step of the previous cycle.

As described above, in the first step (S1), a first adsorption step, a cleaning step and a decompression step are performed in the adsorption towers A, B and C, respectively. The gas flow in this state is shown in FIG. 3A. Specifically, material gas (Gmat) is introduced into the adsorption tower A through the material gas pipe 1 and the automatic valve a. In the adsorption tower A, an unnecessary gas component is removed by the adsorbent and product gas (Gpro) is discharged. The product gas is collected through the automatic valve i and the product gas pipe 2.

Remaining gas (Grem) discharged from the adsorption tower C is introduced into the adsorption tower B through the automatic valve n, the remaining gas outlet pipe 3, the flow rate controlling valve 7, the remaining gas inlet pipe 4 and the automatic valve j. In the sixth step of the previous cycle, adsorption has been performed in the adsorption tower C whereas desorption has been performed in the adsorption tower B (See FIG. 3F). Therefore, the internal pressure of the adsorption tower C is higher than that of the adsorption tower B. Since gas is introduced from the adsorption tower C into the adsorption tower B in this state, the pressure in the adsorption tower C drops. On the other hand, remaining gas (Grem) is discharged from the adsorption tower B. This remaining gas is discharged out of the separation apparatus X through the automatic valve d and the discharge pipe 6.

The amount of remaining gas (cleaning gas) introduced from the adsorption tower C into the adsorption tower B is controlled by the flow rate controlling valve 7. According to the present invention, the amount of gas introduced into the adsorption tower B is 2 to 7 times the volume of the adsorbent loaded in the adsorption tower B, as converted into volume at common temperature and under atmospheric pressure. With this setting, at least part of the remaining gas introduced into the adsorption tower B is discharged from the adsorption tower B.

As described above, in the sixth step (S6) of the previous cycle, an adsorption step has been performed in the adsorption tower C whereas a desorption step has been performed in the adsorption tower B. Therefore, the concentration of the unnecessary gas component in the cleaning gas introduced to the adsorption tower B is lower than that in the gas remaining in the adsorption tower B. Therefore, during the cleaning step, the concentration of the unnecessary gas component (partial pressure of the unnecessary gas) in the adsorption tower B decreases in comparison with that before the cleaning step, which promotes the desorption of the unnecessary gas component from the adsorbent. Further, since the cleaning gas is introduced into the adsorption tower B by an amount larger than that in the prior art method, the unnecessary gas component in the adsorption tower B is reliably discharged. As a result, the concentration of the unnecessary gas component in the adsorption tower B is low when the cleaning step is finished, so that the adsorbent is duly regenerated. In the illustrated embodiment, the maximum pressure reached in the adsorption tower A (adsorption step) lies in the range of 0.2 to 3.6 MPa (absolute pressure, which holds true hereinafter).

Figure 3B:
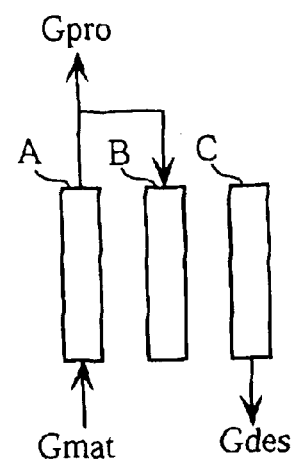

In the second step (S2) shown in FIG. 3B, a second adsorption step, a pressurization step and a desorption step are performed in the adsorption tower A, B and C, respectively (See FIG. 2). Similarly to the first step, material gas is introduced into the adsorption tower A while product gas is discharged from the tower. The product gas is partially collected and partially introduced into the adsorption tower B through the product purge pipe 5, the automatic valve p, the flow rate controlling valve 8, the remaining gas inlet pipe 4 and the automatic valve j. As a result, the pressure in the adsorption tower B is raised. On the other hand, the internal pressure of the adsorption tower C has been reduced through the first step (S1). Further, the automatic valves e, m, n and o are closed whereas the automatic valve f is open. Therefore, the unnecessary gas component is desorbed from the adsorbent in the adsorption tower C and discharged from the adsorption tower C. The desorbed gas (Gdes) is collected through the discharge pipe 6 and the automatic valve f. The minimum pressure in the adsorption tower C in the desorption step lies in the range of atmospheric pressure to 0.15 MPa.

In the second step, the pressurization of the adsorption tower B is performed by the introduction of product gas. Therefore, an unduly large amount of unnecessary gas component is not introduced into the adsorption tower B. Further, the adsorption tower B has been cleaned with the remaining gas discharged from the adsorption tower C in the first step (S1). Also for this reason, after the second step is finished, the concentration of the unnecessary gas component in the adsorption tower B is low. It is to be noted that, in the first step, the adsorption tower C is in the state immediately after an adsorption step is finished. At that time, therefore, the concentration of the unnecessary gas component in the remaining gas in the adsorption tower C is sufficiently low. Therefore, the use of this remaining gas for the cleaning of the adsorption tower B causes no problem.

Figure 3C:
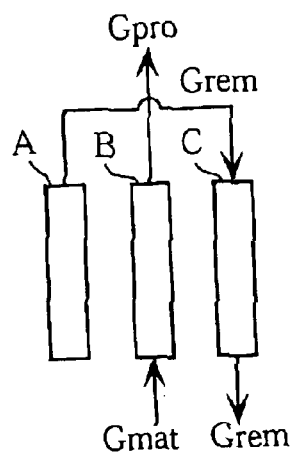
Figure 3D:
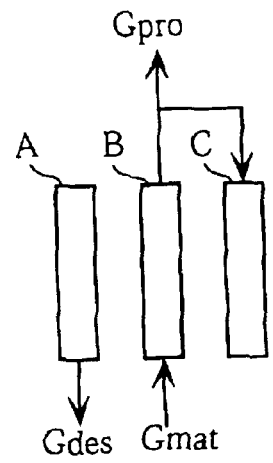

In the third step shown in FIG. 3C, a decompression step, a first adsorption step and a cleaning step are performed in the adsorption towers A, B and C, respectively. Further, in the fourth step shown in FIG. 3D, a desorption step, a second adsorption step and a pressurization step are performed in the adsorption towers A, B and C, respectively. The decompression step and the desorption step performed in the adsorption tower A in these steps are performed similarly to those performed in the adsorption tower C in the first and second steps. The first adsorption step and the second adsorption step in the adsorption tower B are performed similarly to those performed in the adsorption tower A in the first and second steps. The cleaning step and the pressurization step in the adsorption tower C are performed similarly to those performed in the adsorption tower B in the first and second steps.

As described above, the concentration of the unnecessary gas component in the adsorption tower B is low after the second step. Therefore, the adsorption step in the adsorption tower B (the third and the fourth steps) can be performed under the condition where the concentration of the unnecessary gas component is low. As a result, the concentration of the unnecessary gas component is extremely low in the product gas obtained from the adsorption tower B. In this way, the separation method of this embodiment is capable of providing extremely high purity product gas.

Figure 3E:
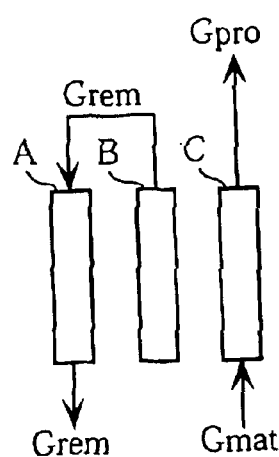
Figure 3F:
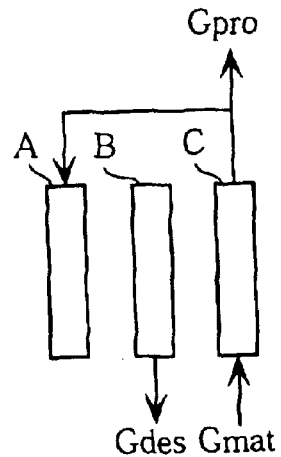

In the fifth step shown in FIG. 3E, a cleaning step, a decompression step and a first adsorption step are performed in the adsorption towers A, B and C, respectively. Further, in the sixth step shown in FIG. 3F, a pressurization step, a desorption step and a second adsorption step are performed in the adsorption towers A, B and C, respectively. The cleaning step and the pressurization step of the adsorption tower A in these steps are performed similarly to those performed in the adsorption tower B in the first and the second steps. The decompression step and the desorption step in the adsorption tower B are performed similarly to those performed in the adsorption tower C in the first and the second steps. The first adsorption step and the second adsorption step in the adsorption tower C are performed similarly to those performed in the adsorption tower A in the first and the second steps.

By repetitively performing the above-described six process steps (S1–S6), the unnecessary gas component is removed from the material gas, thereby providing product gas with a high hydrogen gas concentration.

Next, a hydrogen gas separation method according to a second embodiment of the present invention will be described with reference to FIGS. 4 and 5A–5C. In addition to the steps (first through sixth steps) of the separation method of the first embodiment, the separation method according to the second embodiment includes cleaning steps (AS1', AS3' and AS5') which utilize product gas. As shown in FIG. 4, an additional cleaning step (2nd Cl.) of the adsorption tower B is performed in step AS1' between steps S1 and S2. An additional cleaning step of the adsorption tower C is performed in step AS3' between steps S3 and S4. An additional cleaning of the adsorption tower A is performed in step AS5' between steps S5 and S6. The sign "3rd Ad." in FIG. 4 indicates a third adsorption step.

Figure 5A:
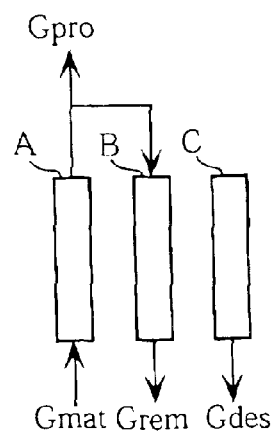
FIGS. 5A–5C illustrate gas flows in additional process steps in the separation method of the second embodiment.
Figure 5B:
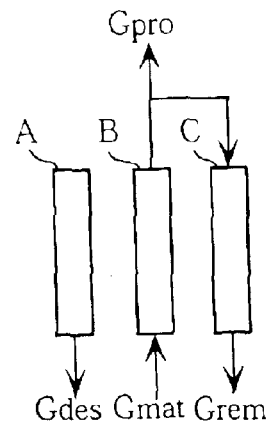
Figure 5C:
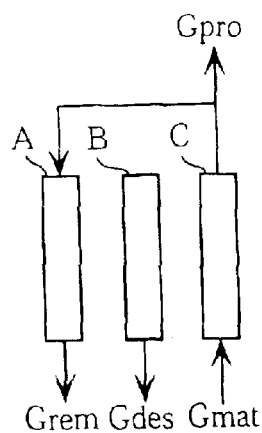

FIGS. 5A, 5B and 5C indicate gas flow in the steps AS1', AS3' and AS5', respectively.

In the step AS1' (FIG. 5A), material gas is introduced into the adsorption tower A while product gas is discharged from the tower in a manner similar to the second step of the first embodiment. The product gas is partially collected and partially introduced into the adsorption tower B through the product purge pipe 5, the automatic valve p, the flow rate controlling valve 8, the remaining gas inlet pipe 4 and the automatic valve j (FIG. 1). By the flow rate controlling valve 8, the amount of product gas (cleaning gas) introduced into the adsorption tower B is controlled to be 0.1 to 1 time the volume of the adsorbent loaded in the adsorption tower B. As a result of the introduction of the cleaning gas, remaining gas is discharged from the adsorption tower B through the automatic valve d and the discharge pipe 6. In the adsorption tower C, a first desorption step is performed similarly to the second step of the first embodiment.

In the step AS3' (FIG. 5B), a first desorption step is performed in the adsorption tower A similarly to that performed in the adsorption tower C in the step AS1'. Further, a second adsorption step is performed in the adsorption tower B similarly to that performed in the adsorption tower A in the step AS1'. Further, a second cleaning step is performed in the adsorption tower C similarly to that performed in the adsorption tower B in the step AS1'.

In the step AS5' (FIG. 5C), an additional (second) cleaning is performed in the adsorption tower A similarly to that performed in the adsorption tower B in the step AS1'. Further, a first desorption step is performed in the adsorption tower B similarly to that performed in the adsorption tower C in the step AS1'. Further, a second adsorption step is performed in the adsorption tower C similarly to that performed in the adsorption tower A in the step AS1'.

According to the second embodiment of the present invention, a second cleaning step is performed after a first cleaning step. The first cleaning step is performed utilizing remaining gas obtained from an adsorption tower in which adsorption has been finished. The second cleaning step is performed utilizing product gas obtained from an adsorption tower in which adsorption is proceeding. Specifically, using the adsorption tower B as an example, the first cleaning step (FIG. 3A) is performed utilizing remaining gas obtained from the adsorption tower C in which adsorption has been finished, whereas the second cleaning step (FIG. 5A) is performed utilizing product gas obtained from the adsorption tower A in which adsorption is proceeding. Herein, it is to be noted that the concentration of the unnecessary gas component in the product gas is lower than that in the remaining gas. Therefore, the interior of each adsorption tower can be cleaned more reliably by firstly cleaning with remaining gas and then cleaning with product gas, which enhances the regeneration efficiency of the adsorbent. Further, owing to the previous cleaning with the remaining gas, the amount of product gas required for the second cleaning is reduced. Therefore, it is possible to prevent or inhibit the product gas introduced into the adsorption tower from being discharged, which enhances the recovery of hydrogen gas.

Next, a hydrogen gas separation method according to a third embodiment of the present invention will be described with reference to FIGS. 6, 7 and 8A–8L.

Figure 6:
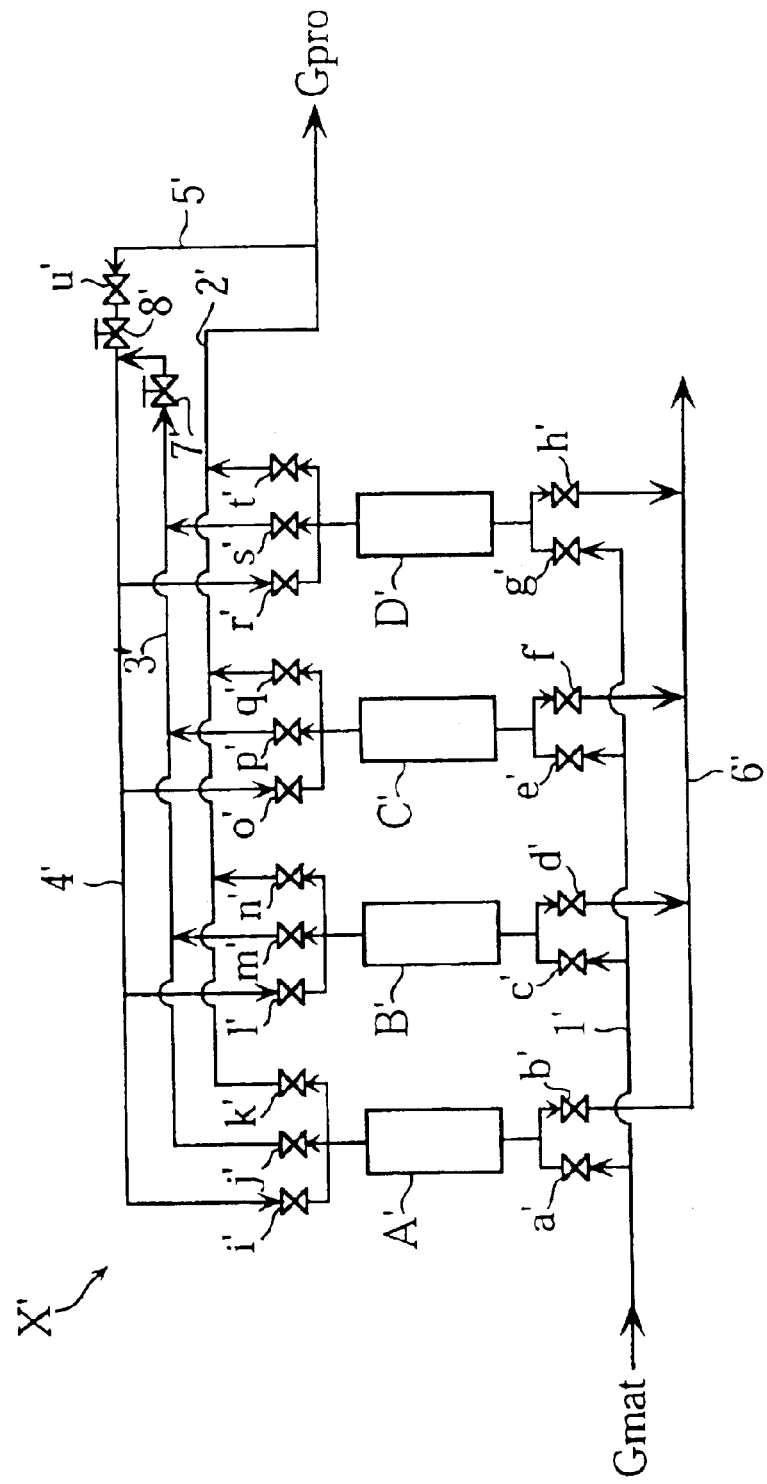
FIG. 6 schematically illustrates a PSA separation apparatus used for performing a separation method according to a third embodiment of the present invention.
Figure 10A:
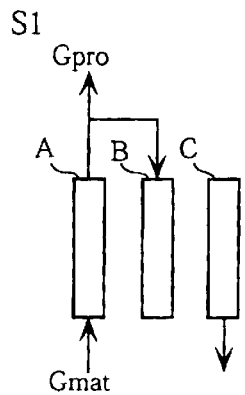
FIGS. 10A–10I illustrate gas flows in performing the separation method of FIG. 9.
Figure 10B:
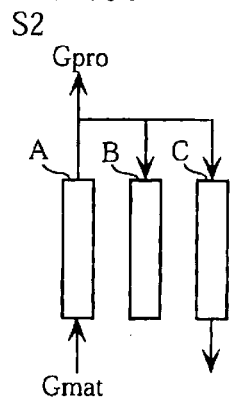
Figure 10C:
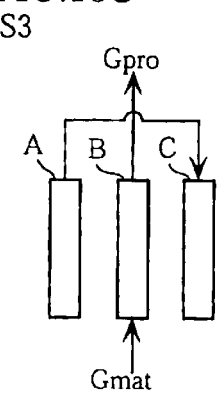
Figure 10D:
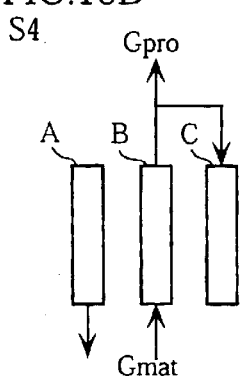
Figure 10E:
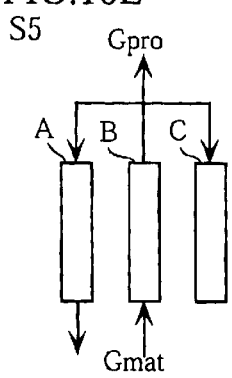
Figure 10F:
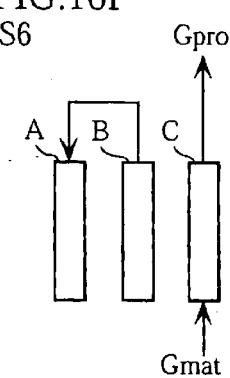
Figure 10G:
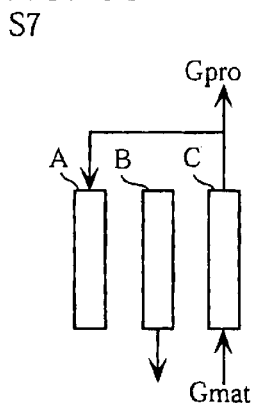
Figure 10H:
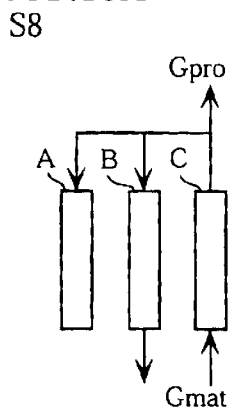
Figure 10I:
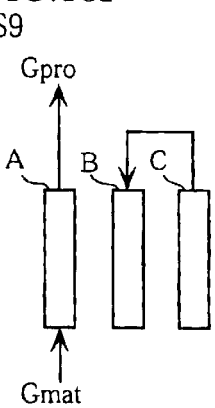

FIG. 6 illustrates main structural members of a PSA separation apparatus X' for embodying the separation method of the third embodiment. The separation apparatus X' includes four adsorption towers A', B', C' and D'. The reference signs a'–u' indicate automatic valves. The separation apparatus X' further includes a material gas pipe 1', a product gas pipe 2', a remaining gas outlet pipe 3', a remaining gas inlet pipe 4', a product purge pipe 5' and a discharge pipe 6'. The remaining gas outlet pipe 3' and the remaining gas inlet pipe 4' are provided with flow rate controlling valves 7' and 8', respectively.

Figure 7:
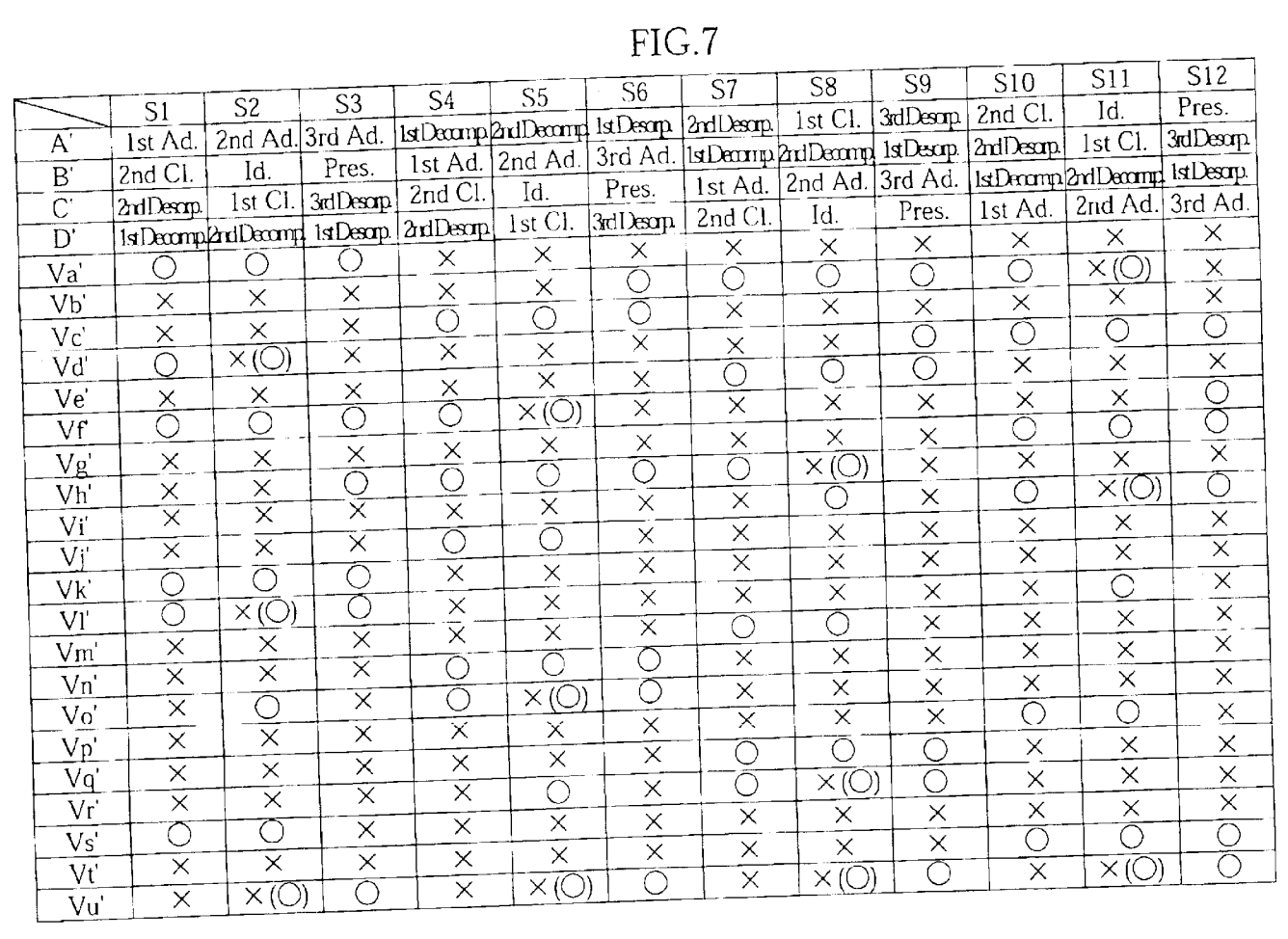

As will be understood from FIG. 7, in the separation method of the third embodiment, one cycle consisting of twelve steps (a first step S1 through a twelfth step 12) are repetitively performed in each of the adsorption towers. FIGS. 8A–8L illustrate gas flow in the first step S1 through the twelfth step S12.

In the first step (S1), a first adsorption step (1st Ad.), a second cleaning step (2nd Cl.), a second desorption step (2nd Desorp.) and a first decompression step (1st Decomp.) are performed in the adsorption towers A', B', C' and D', respectively (FIG. 7). At that time, material gas (Gmat) is introduced into the adsorption tower A' through the material gas pipe 1' and the automatic valve a' (FIG. 8A). An unnecessary gas component is removed by the adsorbent in the adsorption tower A' and product gas (Gpro) is discharged to the outside of the tower. The product gas is collected through the automatic valve k' and the product gas pipe 2'.

Remaining gas (cleaning gas) discharged from the adsorption tower D' is introduced into the adsorption tower B' through the automatic valve s', the remaining gas outlet pipe 3', the flow rate controlling valve 7', the remaining gas inlet pipe 4' and the automatic valve 1'. The adsorption tower D' has previously undergone an adsorption step whereas the adsorption tower B' has previously undergone a (third) desorption step (twelfth step S12). Therefore, the internal pressure of the adsorption tower D' is higher than that of the adsorption tower B'. Therefore, when the remaining gas of the adsorption tower D' is introduced into the adsorption tower B', the internal pressure of the adsorption tower D' drops while remaining gas is discharged from the adsorption tower B' through the automatic valve d' and the discharge pipe 6'.

The amount of remaining gas introduced from the adsorption tower D' into the adsorption tower B' is controlled by the flow rate controlling valve 7'. According to the present invention, the amount of gas introduced is set to be 2 to 5 times the volume of the adsorbent loaded in the adsorption tower B' (as converted into volume at common temperature and under atmospheric pressure).

In the adsorption tower C', a desorption step is continued following the twelfth step (S12). In the first step (S1), the internal pressure of the adsorption tower C' has been reduced, and the automatic valves e', o', p' and q' are closed whereas the automatic valve f' is open. Therefore, the unnecessary gas component is desorbed from the adsorbent in the adsorption tower C' and discharged together with the gas in the adsorption tower C'. The discharged gas is collected through the automatic valve f' and the discharge pipe 6'.

In the second step (S2), a second adsorption step (2nd Ad.), an idling step (Id), a first cleaning step (1st Cl.), a second decompression step (2nd Decomp.) are performed in the adsorption towers A', B', C' and D', respectively. The gas flow at that time is illustrated in FIG. 8B. As shown in the figure, the adsorption step in the adsorption tower A' is performed similarly to that in the first step. The adsorption tower B' is kept idling (Id) with the automatic valves c', d', l', m' and n' closed. Remaining gas (cleaning gas) discharged from the adsorption tower D' is introduced into the adsorption tower C' through the automatic valve s', the remaining gas outlet pipe 3', the flow rate controlling valve 7', the remaining gas inlet pipe 4' and the automatic valve o'. As a result, the internal pressure of the adsorption tower D' drops while remaining gas is discharged from the adsorption tower C' through the automatic valve f' and the discharge pipe 6'. The amount of remaining gas introduced from the adsorption tower D' into the adsorption tower C' is controlled by the flow rate controlling valve 7'. According to the present invention, the amount of gas introduced is set to be 1 to 3 times the volume of the adsorbent loaded in the adsorption tower C' (as converted into volume at common temperature and under atmospheric pressure).

In the third step (S3), a third adsorption step (3rd Ad.), a pressurization step (Pres.), a third desorption step (3rd Desorp.) and a first desorption step (1st Desorp.) are performed in the adsorption towers A', B', C' and D', respectively. The gas flow at that time is illustrated in FIG. 8C.

As will be understood from FIG. 8C, material gas is introduced into the adsorption tower A' while product gas is discharged from the tower similarly to the first step. The product gas is partially collected and partially introduced into the adsorption tower B' through the product purge pipe 5', the automatic valve u', the flow rate controlling valve 8', the remaining gas inlet pipe 4' and the automatic valve 1'. As a result, the pressure in the adsorption tower B' increases.

In the adsorption tower C', the unnecessary gas component is desorbed from the adsorbent similarly to the first step. The desorbed gas is discharged through the automatic valve f' and the discharge pipe 6'. Similarly, desorption of the unnecessary gas component occurs also in the adsorption tower D'. At that time, the automatic valves g', r', s' and t' are closed while the automatic valve h' is open. The desorbed gas is discharged together with the remaining gas of the adsorption tower D' through the automatic valve h' and the discharge pipe 6'.

In respective fourth, fifth and sixth steps (S4, S5 and S6), a first decompression step (1st Decomp.), a second decompression step (2nd Decomp.) and a first desorption step (1st Desorp.) are performed in the adsorption tower A', similarly to those performed in the adsorption tower D' in the steps S1–S3. Further, in the adsorption tower B', a first adsorption step (1st Ad.), a second adsorption step (2nd Ad.) and a third adsorption step (3rd Ad.) are performed similarly to those performed in the adsorption tower A' in the steps S1–S3. In the adsorption tower C', a second cleaning step (2nd Cl.), an idling step (Id) and a pressurization step (Pres.) are performed similarly to those performed in the adsorption tower B' in the steps S1–S3. In the adsorption tower D', a second desorption step (2nd Desorp.), a first cleaning step (1st Cl.) and a third desorption step (3rd Desorp.) are performed similarly to those performed in the adsorption tower C' in the steps S1–S3.

In respective seventh, eighth and ninth steps (S7, S8 and S9), a second desorption step (2nd Desorp.), a first cleaning step (1st Cl.) and a third desorption step (3rd Desorp.) are performed in the adsorption tower A', similarly to those performed in the adsorption tower C' in the steps S1–S3. In the adsorption tower B', a first decompression step (1st Decomp.) a second decompression step (2nd Decomp.) and a first desorption step (1st Desorp.) are performed similarly to those performed in the adsorption tower D' in the steps S1–S3. In the adsorption tower C', a first adsorption step (1st Ad.), a second adsorption step (2nd Ad.) and a third adsorption step (3rd Ad.) are performed similarly to those performed in the adsorption tower A' in the steps S1–S3. In the adsorption tower D', a second cleaning step (2nd Cl.), an idling step (Id) and a pressurization step (Pres.) are performed similarly to those performed in the adsorption tower B' in the steps S1–S3.

In respective tenth, eleventh and twelfth steps (S10, S11 and S12), a second cleaning step (2nd Cl.), an idling step (Id.) and a pressurization step (Pres.) are performed in the adsorption tower A', similarly to those performed in the adsorption tower B' in the steps S1–S3. In the adsorption tower B', a second desorption step (2nd Desorp.), a first cleaning step (1st Cl.) and a third desorption step (3rd Desorp.) are performed similarly to those performed in the adsorption tower C' in the steps S1–S3. In the adsorption tower C', a first decompression step (1st Decomp.), a second decompression step (2nd Decomp.) and a first desorption step (1st Desorp.) are performed similarly to those performed in the adsorption tower D' in the steps S1–S3. In the adsorption tower D', a first adsorption step (1st Ad.), a second adsorption step (2nd Ad.) and a third adsorption step (3rd Ad.) are performed similarly to those performed in the adsorption tower A' in the steps S1–S3.

In all of the adsorption towers A', B', C' and D', the maximum pressure in the first through the third adsorption steps is set to lie in the range of 0.2 to 3.6 Mpa, whereas the minimum pressure in the desorption steps is set to lie in the range of atmospheric pressure to 0.15 MPa.

In the above-described separation method, from the adsorption tower D' in which the adsorption steps (S10–S12) have been finished, remaining gas (cleaning gas) is introduced in the first decompression step (S1) into the adsorption tower B' (FIG. 8A). At that time, the adsorption tower B' is undergoing the second cleaning step. Further in the second decompression step (S2), remaining gas (cleaning gas) is introduced from the adsorption tower D' to the adsorption tower C' (FIG. 8B). At that time, the adsorption tower C' is undergoing the first cleaning step. As shown in FIGS. 8A and 8B, remaining gas is taken out through the upper side of the adsorption tower D' (i.e. from the side through which product gas is discharged in step S12). Therefore, the remaining gas contains a lower concentration of unnecessary gas component than in the case where the remaining gas is discharged through the lower side of the adsorption tower D'. Further, the remaining gas taken out in the first step (S1) contains a lower concentration of unnecessary gas component than the remaining gas taken out in the second step (S2). Thus, according to the separation method, the adsorption tower C' in the first cleaning step is cleaned with remaining gas containing a relatively high concentration of unnecessary gas component, whereas the adsorption tower B' in the second cleaning step is cleaned with remaining gas containing a relatively low concentration of unnecessary gas component. This is because the adsorption tower in the second cleaning step has already been cleaned to a higher degree than the adsorption tower in the first cleaning step.

Now, the adsorption tower C' in the steps S1–S4 is to be noted. Through the four steps, a (second) desorption step, a (first) cleaning step, a (third) desorption step and a (second) cleaning step are performed in the adsorption tower C' in the mentioned order. When the desorption step of the step S1 is finished, remaining gas containing the unnecessary gas component exists in the adsorption tower C'. In the step S2, the remaining gas is discharged out of the adsorption tower C' by remaining gas introduced from the adsorption tower D'. As described above, the remaining gas introduced in the step S2 contains a higher concentration of unnecessary gas component than that introduced into the adsorption tower B' in the step S1. However, the concentration of the unnecessary gas component in the remaining gas introduced in the step S2 is still lower than that of the remaining gas existing in the adsorption tower C' when the step S1 is finished. Therefore, the cleaning of the adsorption tower C' in the step S2 is effective, so that the concentration of the unnecessary gas component in the adsorption tower C' after finishing the step S2 is lower than that before the cleaning. As a result, the partial pressure of the unnecessary gas component in the adsorption tower C' decreases, which promotes the desorption of the unnecessary gas component from the adsorbent. This is advantageous for reliably regenerating the adsorbent in the third desorption step of S3. In the step S4, remaining gas in the adsorption tower C' is discharged by introducing remaining gas from the adsorption tower A' which is undergoing the first decompression step. Since the concentration of the unnecessary gas component in this remaining gas is relatively low, it is possible to further reduce the concentration of the unnecessary gas component in the adsorption tower C'. As a result, a larger amount of unnecessary gas component is desorbed from the adsorbent in the adsorption tower C'. In this way, the regeneration efficiency of the adsorbent is greatly enhanced.

According to the third embodiment, each of the adsorption towers is in the idle state after a second cleaning step. Specifically, the adsorption tower A' in the step S11, the adsorption tower B' in the step S2, the adsorption tower C' in the step S5 and the adsorption tower D' in the step S8 are in the idle state. According to the present invention, an additional cleaning step may be provided for each adsorption tower in the idle state (See broken lines in FIGS. 8B, 8E, 8H and 8K). In the case where such an additional cleaning step is performed, the open/close state of the automatic valves is partially changed as indicated in parentheses in FIG. 7. For example, when the additional cleaning is performed for the adsorption tower B' in the step S2, the automatic valves d', 1' and u' are kept open.

As shown in FIGS. 8B, 8E, 8H and 8K, the additional cleaning is performed using product gas as cleaning gas. The concentration of the unnecessary gas component in the product gas is lower than that in the remaining gas introduced in the second cleaning step. Therefore, the additional cleaning can further clean the interior of the adsorption tower. Further, since the additional cleaning step is performed after the first and the second cleaning step, it requires only a relatively small amount of cleaning gas (product gas).

Next, the effectiveness of the present invention will be described using the following Examples 1–6.

In Examples 1–5, the separation method (the present invention) shown in FIG. 2 was utilized for separating hydrogen gas from material gas. In Example 6, the separation method (prior art) shown in FIG. 9 was utilized for separating hydrogen gas from material gas. In all of the Examples 1–6, the separation apparatus X as shown in FIG. 1 was used for performing the separation.

As described above, the separation apparatus X includes three adsorption towers. Each of the adsorption towers has a cylindrical configuration having a diameter of 50 mm. The adsorbent used contained zeolite molecular sieve (Ca5A type) and carbon molecular sieve in the ratio of 1:1.3 by volume. 2.935 liters of the adsorbent was loaded in each of the adsorption towers. The material gas used contained 77.77% hydrogen gas, 19.62% carbon dioxide gas, 1% carbon monoxide gas, 0.0008% nitrogen gas and 1.61% methane gas by volume. The material gas was introduced at 851 Nliters/hr.

EXAMPLE 1

In Example 1, the maximum pressure during the adsorption step was set to 0.95 MPa, whereas the minimum pressure during the desorption step was set to be approximately equal to atmospheric pressure (0.106 MPa). The final pressure during the decompression step was set to 0.45 MPa. As described above, in the separation method of FIG. 2, remaining gas in an adsorption tower in which adsorption has been finished is introduced, as cleaning gas, into another adsorption tower to be cleaned. In Example 1, the introduction amount of the cleaning gas was set to be about 5 times the volume of the adsorbent (2.935 liters).

As a result of the experiment of Example 1, 503 Nliters/hr of hydrogen gas recovered, and the purity of the hydrogen gas was 99.999 vol %. The yield of hydrogen gas was 76.0%.

EXAMPLE 2

In Example 2, the final pressure during the decompression step was set to 0.75 MPa. In the cleaning step, cleaning gas (remaining gas) was introduced in an amount approximately twice the amount of the adsorbent loaded. Other conditions were the same as those of Example 1.

As a result of the experiment of Example 2, 468 Nliters/hr of hydrogen gas was recovered, and the purity of the hydrogen gas was 99.999 vol %. The yield of hydrogen gas was 70.7%.

EXAMPLE 3

In Example 3, the final pressure during the decompression step was set to 0.55 MPa. In the cleaning step, cleaning gas (remaining gas) was introduced in an amount approximately 4 times the amount of the adsorbent loaded. Other conditions were the same as those of Example 1.

As a result of the experiment of Example 3, 496 Nliters/hr of hydrogen gas recovered, and the purity of the hydrogen gas was 99.999 vol %. The yield of hydrogen gas was 75.0%.

EXAMPLE 4

In Example 4, the final pressure during the decompression step was set to 0.35 MPa. In the cleaning step, cleaning gas (remaining gas) was introduced in an amount approximately 6 times the amount of the adsorbent loaded. Other conditions were the same as those of Example 1.

As a result of the experiment of Example 4, 496 Nliters/hr of hydrogen gas was recovered and the purity of the hydrogen gas was 99.999 vol %. The yield of hydrogen gas was 75.0%.

EXAMPLE 5

In Example 5, the final pressure during the decompression step was set to 0.25 MPa. In the cleaning step, cleaning gas (remaining gas) was introduced in an amount approximately 7 times the amount of the adsorbent loaded. Other conditions were the same as those of Example 1.

As a result of the experiment of Example 5, 492 Nliters/hr of hydrogen gas was recovered, and the purity of the hydrogen gas was 99.999 vol %. The yield of hydrogen gas was 74.4%.

EXAMPLE 6

In Example 6, hydrogen gas was separated from the material gas utilizing the method (prior art method including a pressure equalization step) shown in FIG. 9, as described above. Therefore, product gas obtained from an adsorption tower during an adsorption step was utilized as cleaning gas. Cleaning gas (product gas) was introduced in an amount approximately 0.7 time the amount of the adsorbent loaded. Other conditions were the same as those of Example 1.

As a result of the experiment of Example 6, 463 Nliters/hr of hydrogen gas was recovered, and the purity of the hydrogen gas was 99.999 vol %. The yield of hydrogen gas was 70.0%.

As is clear from the above, as compared with the prior art method (Example 6), the recovered amount and yield of hydrogen gas (product gas) is enhanced in the cases (Examples 1–5) where remaining gas is used as cleaning gas and the amount of cleaning gas introduced is 2 to 7 times the amount of loaded adsorbent.

In this way, the present invention can enhance the yield of target gas while using an adsorbent similar to those used in the prior art method. However, for removing both carbon dioxide and carbon monoxide at the same time, two kinds of adsorbents (activated carbon-based adsorbent and zeolite) need be used. As pointed out before, this causes an increase in the amount of adsorbents to be loaded in each adsorption tower and hence increases the size of the separation apparatus.

As a result of the inventors' intensive study for solving the above-described problem, it is found that the use of zeolite having a particular structure described below makes it possible to adsorb both carbon dioxide and carbon monoxide without using activated carbon-based adsorbent.

Specifically, zeolite according to the present invention has a faujasite structure and has a Si/Al ratio of 1–1.5 and a lithium-exchange ratio of no less than 95%. The object to be exchanged with lithium may be Na ion which is a component of zeolite.

The zeolite is obtained in the following manner.

First, aluminate solution and silicate solution are mixed homogeneously. After maturing at 40–60° C. for 20–50 hours, the mixed solution is crystallized at 90–100° C. for 2–5 hours. Subsequently, the crystal thus formed is separated from the solution by filtration and then washed with distilled water. The washed crystal is dried at 70–100° C. and then baked at 500–600° C. for several hours. As a result, zeolite having a faujasite structure and has a Si/Al ratio of 1–1.5 is obtained. Specifically, as aluminate, use may be made of sodium aluminate or potassium aluminate, for example. As silicate, use may be made of sodium silicate, for example.

Subsequently, the zeolite thus prepared is immersed in 0.5–5M of lithium chloride solution held at 70–100° C. for ion exchange. The zeolite is then washed with dilute solution of lithium hydroxide. By repeating such process steps a plurality of times, zeolite with a lithium-exchange ratio of no less than 95% is obtained.

Description will be given below as to the advantages of the use of the zeolite according to the present invention in the PSA process.

Figure 11:
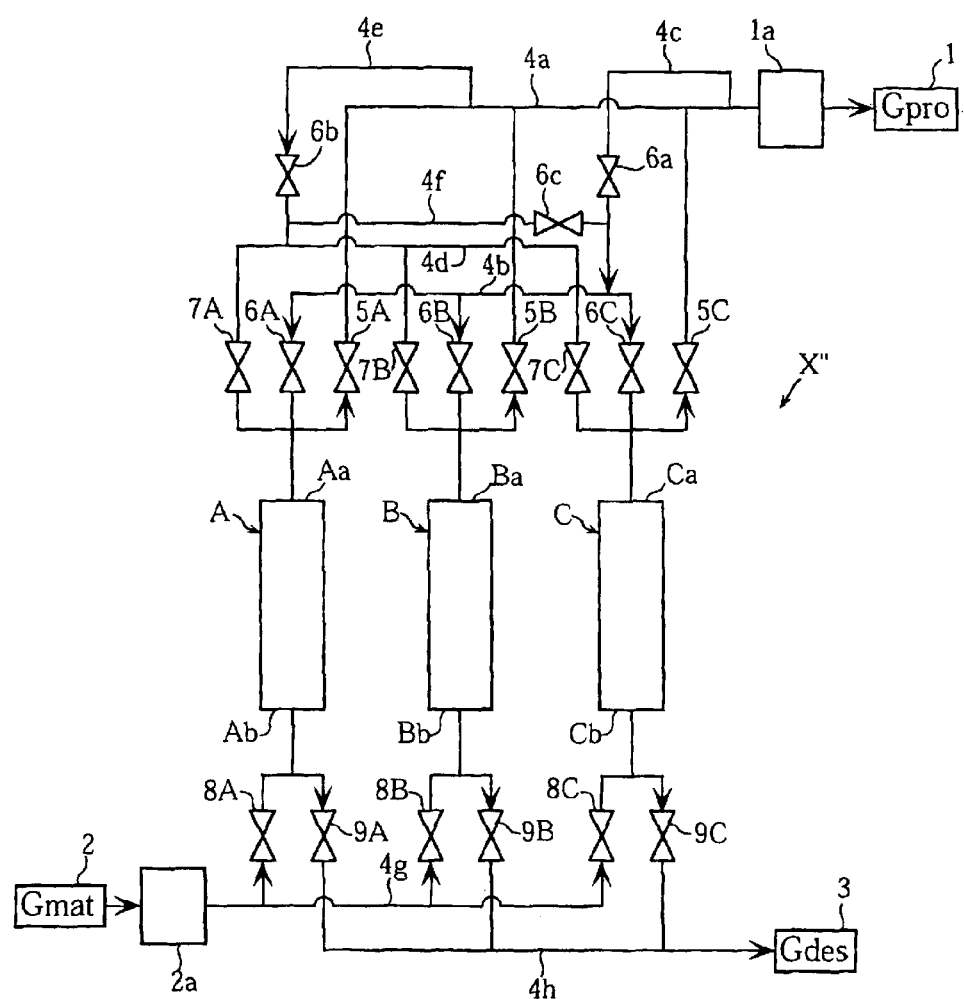
FIG. 11 schematically illustrates a separation apparatus which can be used for performing a gas separation method according to the present invention.

First, reference is made to FIG. 11. This figure schematically illustrates the structure of a separation apparatus X" used for separating target gas from material gas by the PSA process. Specifically, the separation apparatus X" includes three adsorption towers A–C, a product gas collector 1, a material gas supply 2, and a desorbed gas collector 3. The signs "Gmat", "Gpro" and "Gdes" in the figure indicate material gas, product gas and desorbed gas, respectively.

The adsorption towers A, B and C include product gas outlets Aa, Ba and Ca, respectively, and further include material gas inlets Ab, Bb and Cb, respectively. Each of the adsorption towers A–C is loaded with an adsorbent.

The product gas outlets Aa, Ba and Ca of the adsorption towers A, B and C are connected to the product gas collector 1 through automatic valves 5A–5C and a pipe 4a. The pipe 4a, which is for product gas collection, is provided with a product gas flowmeter 1a.

The product gas outlets Aa, Ba and Ca are connected to the product gas collection pipe 4a via pipes 4b and 4c. The pipe 4b, which is for pressure equalization gas and pressurization gas, is provided with automatic valves 6A–6C. The pipe 4c, which is for pressurization gas, is provided with an automatic valve 6a. The product gas outlets Aa, Ba and Ca are connected to the product gas collection pipe 4a also via pipes 4d and 4e. The pipe 4d, which is for pressure equalization gas/cleaning gas, is provided with automatic valves 7A–7C. The pipe 4e, which is for cleaning gas, is provided with an automatic valve 6b. The product gas outlets Aa, Ba and Ca are connected to each other via the pipes 4b, 4d and a pipe 4f for pressure equalization. The pipe 4f is provided with an automatic valve 6c.

The material gas inlets Ab, Bb and Cb of the adsorption towers A, B and C are connected to the material gas supply 2 via a material gas supply pipe 4g. The pipe 4g is provided with automatic valves 8A–8C and a material gas flowmeter 2a. The material gas inlets Ab, Bb and Cb are connected also to the desorbed gas collector 3 through a desorbed gas collection pipe 4h. The pipe 4h is provided with automatic valves 9A–9C.

The gas flow in each of the pipes 4a–4h is controlled by appropriately opening or closing each of the automatic valves 5A–5C, 6A–6C, 6a–6c, 7A–7C, 8A–8C and 9A–9C. As a result, an adsorption step, a first pressure equalization step (decompression step), a desorption step, a cleaning step, a second pressure equalization step (pressurization step) and pressurization step are repetitively performed in each of the adsorption towers A, B and C. In the adsorption step, adsorption of unnecessary gas components to the adsorbent is performed under high pressure. In the first pressure equalization step (decompression step) and the second pressure equalization step (pressurization step), introduction or discharge of gas is performed between adsorption towers. In the desorption step, unnecessary gas components are desorbed from the adsorbent. In the cleaning step, desorbed gas remaining in an adsorption tower is discharged. In the pressurization step, pressure in an adsorption tower is raised as preparation for an adsorption step.

Figures 13, 14:
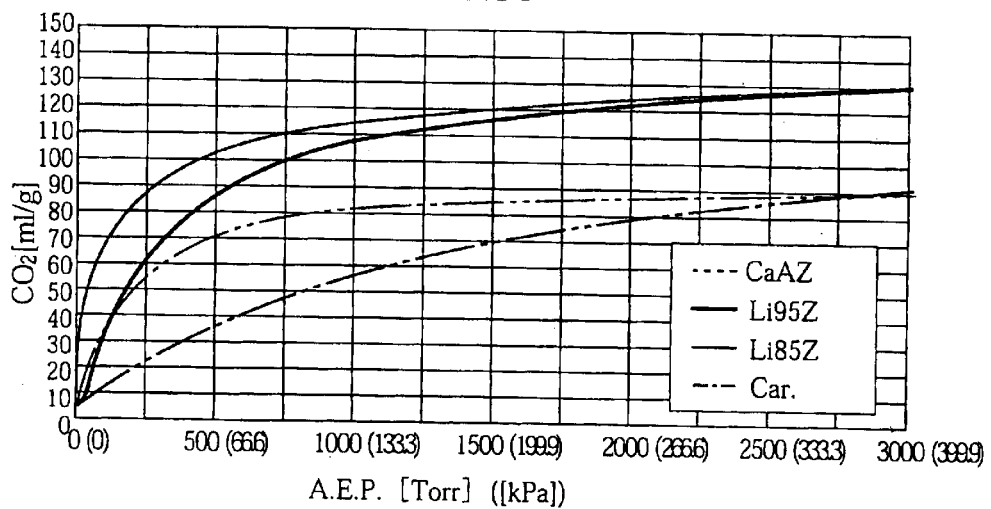
FIG. 13 is a table showing process steps performed in the apparatus of FIG. 11.
FIG. 14 is a graph showing the effectiveness of a zeolite-based adsorbent according to the present invention.

The above-described five steps (an adsorption step, a pressure equalization step, a desorption step, a cleaning step and a pressurization step) are performed in each of the adsorption towers at timing shown in the table of FIG. 13. The signs "Ad.", "PE", "Des.", "Cl." and "Pres." in the figure indicate an adsorption step, a pressure equalization step, a desorption step, a cleaning step and a pressurization step, respectively.

In the section marked with "V.O.", reference signs of automatic valves which are kept open are described. For example, in the first step (S1), an adsorption step (Ad.) is performed in the adsorption tower A, whereas a pressure equalization step (PE) is performed in the adsorption towers B and C. At that time, the valves 5A, 8A, 6B, 7C and 6C are open whereas other valves are closed. The second step (S2) through the ninth step (S9) are likewise represented in the table.

FIGS. 12A–12I illustrate gas flow in the first step (S1) through the twelfth step (S12).

As described above, in the first step (S1), an adsorption step is performed in the adsorption tower A, whereas a pressure equalization step is performed in the adsorption towers B and C. The gas flow in the first step is illustrated in FIG. 12A. In the adsorption tower A, the product gas outlet Aa is held in communication with the product gas collector 1, whereas the material gas inlet Ab is held in communication with the material gas supply 2. Material gas is supplied from the material gas supply 2 to the material gas inlet Ab through the pipe 4g. Unnecessary gas components including carbon dioxide are removed in the adsorption tower A and product gas is outputted through the product gas outlet Aa. The product gas is collected in the product gas collector 1 through the pipe 4a. The amount of material gas supplied to the adsorption tower A is monitored by the material gas flowmeter 2a for adjusting the flow rate. The amount of product gas collected in the product gas collector 1 is monitored by the product gas flowmeter 1a for adjusting the flow rate. The supply pressure of material gas may be 0.5–4 MPa, whereas the recovery pressure of product gas may be 0.4–3.9 MPa, for example.

The adsorption tower B is held in communication with the adsorption tower C via the product gas outlets Ba and Ca. The pressure in the adsorption tower C is relatively high due to the adsorption step previously performed therein, whereas the pressure in the adsorption tower B is relatively low due to the cleaning step previously performed therein (See the ninth step). In the first step, therefore, remaining gas in the adsorption tower C is discharged through the product gas outlet Ca and introduced into the adsorption tower B through the pipes 4d, 4f, 4b and the product gas outlet Ba. As a result, the pressure in the adsorption tower C drops, whereas the pressure in the adsorption tower B increases. (That is, pressure equalization is provided between the adsorption towers B and C.)

In the second step (S2), the automatic valves 5A, 8A, 6B, 9C and 6a are kept open to realize the gas flow shown in FIG. 12B. An adsorption step, a pressurization step and a desorption step are performed in the adsorption tower A, B and C, respectively. In the second step, the product gas outlet Aa of the adsorption tower A is held in communication with the product gas collector 1 and the adsorption tower B, whereas the product gas inlet Ab is held in communication with the material gas supply 2. In the second step, product gas is obtained similarly to the first step. However, part of the product gas is introduced into the adsorption tower B through the pipes 4c and 4b as purge gas (pressurization gas). At that time, the material gas inlet Bb of the adsorption tower B is closed, so that the pressure in the adsorption tower B is increased by the purge gas introduced from the adsorption tower A.

The product gas outlet Ca of the adsorption tower C is kept closed. The material gas inlet Cb of the adsorption tower C is held in communication with the desorbed gas collector 3. The pressure in the adsorption tower C has dropped to some degree by the pressure equalization step performed in the first step. Therefore, unnecessary gas components are desorbed from the adsorbent in the adsorption tower C. At the same time, remaining gas is discharged through the material gas inlet Cb and collected in the desorbed gas collector 3 through the pipe 4h. The discharge of remaining gas causes the internal pressure of the adsorption tower C to further drop, which promotes desorption of unnecessary gas components from the adsorbent.

In the third step (S3), the automatic valves 5A, 8A, 6B, 7C, 9C, 6a and 6b are kept open to realize the gas flow shown in FIG. 12C. An adsorption step, a pressurization step and a cleaning step are performed in the adsorption towers A, B and C, respectively.

In the third step, the product gas outlet Aa of the adsorption tower A is held in communication with the product gas collector 1, the adsorption tower B and the adsorption tower C, whereas the material gas inlet Ab is held in communication with the material gas supply 2. Therefore, in the third step, product gas is obtained similarly to the first step, but part of the product gas is supplied to the adsorption towers B and C. In the adsorption tower B, a pressurization step is performed similarly to the second step. The product gas outlet Ca of the adsorption tower C is held in communication with the product gas outlet Aa of the adsorption tower A, whereas the material gas inlet Cb is held in communication with the desorbed gas collector 3. Therefore, the product gas is introduced to the product gas outlet Ca of the adsorption tower C through the pipes 4e and 4d as cleaning gas. As a result, remaining gas in the adsorption tower C is collected in the desorbed gas collector 3 through the pipe 4h.

In the fourth step (S4), the automatic valves 7A, 5B, 8B, 6C and 6c are kept open to realize the gas flow shown in FIG. 12D. A pressure equalization step, an adsorption step and a pressure equalization step are performed in the adsorption towers A, B and C, respectively. The pressure equalization step in the adsorption tower A is performed similarly to the pressure equalization (decompression) step performed in the adsorption tower C in the first step. The adsorption step in the adsorption tower B is performed similarly to the adsorption step performed in the adsorption tower A in the first step. The pressure equalization step in the adsorption tower C is performed similarly to the pressure equalization (pressurization) step performed in the adsorption tower B in the first step.

In the fifth step (S5), the automatic valves 9A, 5B, 8B, 6C and 6a are kept open to realize the gas flow shown in FIG. 12E. A desorption step, an adsorption step and a pressurization step are performed in the adsorption towers A, B and C, respectively. The desorption step in the adsorption tower A is performed similarly to the desorption step performed in the adsorption tower C in the second step. The adsorption step in the adsorption tower B is performed similarly to the adsorption step performed in the adsorption tower A in the second step. The pressurization step in the adsorption tower C is performed similarly to the pressurization step performed in the adsorption tower B in the second step.

In the sixth step (S6), the automatic valves 7A, 9A, 5B, 8B, 6C, 6a and 6b are kept open to realize the gas flow shown in FIG. 12F. A cleaning step, an adsorption step and a pressurization step are performed in the adsorption towers A, B and C, respectively. The cleaning step in the adsorption tower A is performed similarly to the cleaning step performed in the adsorption tower C in the third step. The adsorption step performed in the adsorption tower B is performed similarly to the adsorption step performed in the adsorption tower A in the third step. The pressurization step performed in the adsorption tower C is performed similarly to the pressurization step performed in the adsorption tower B in the third step.

In the seventh step (S7), the automatic valves 6A, 7B, 5C, 8C and 6c are kept open to realize the gas flow shown in FIG. 12G. A pressure equalization step is performed in the adsorption towers A and B, whereas an adsorption step is performed in the adsorption tower C. The pressure equalization step in the adsorption tower A is performed similarly to the pressure equalization (pressurization) step performed in the adsorption tower B in the first step. The pressure equalization step in the adsorption tower B is performed similarly to the pressure equalization (decompression) step performed in the adsorption tower C in the first step. The adsorption step in the adsorption tower C is performed similarly to the adsorption step performed in the adsorption tower A in the first step.

In the eighth step (S8), the automatic valves 6A, 9B, 5C, 8C and 6a are kept open to realize the gas flow shown in FIG. 12H. A pressurization step, a desorption step and an adsorption step are performed in the adsorption towers A, B and C, respectively. The pressurization step in the adsorption tower A is performed similarly to the pressurization step performed in the adsorption tower B in the second step. The desorption step in the adsorption tower B is performed similarly to the desorption step performed in the adsorption tower C in the second step. The adsorption step in the adsorption tower C is performed similarly to the adsorption step performed in the adsorption tower A in the second step.

In the ninth step (S9), the automatic valves 6A, 7B, 9B, 5C, 8C, 6a and 6b are kept open to realize the gas flow shown in FIG. 12I. A pressurization step, a cleaning step and an adsorption step are performed in the adsorption towers A, B and C, respectively. The pressurization step in the adsorption tower A is performed similarly to the pressurization step performed in the adsorption tower B in the third step. The cleaning step in the adsorption tower B is performed similarly to the cleaning step performed in the adsorption tower C in the third step. The adsorption step in the adsorption tower C is performed similarly to the adsorption step performed in the adsorption tower A in the third step.

By repetitively performing the above-described first (S1) through the ninth (S9) steps, product gas from which unnecessary gas components have been removed is provided.

In the desorption steps and the cleaning steps described above, desorbed gas released from the adsorbent and remaining as in the adsorption towers are collected into the desorbed as collector 3. However, in the case where the desorbed gas and the remaining gas are less toxic, it is possible to release these gases into the atmosphere.

Figure 17:
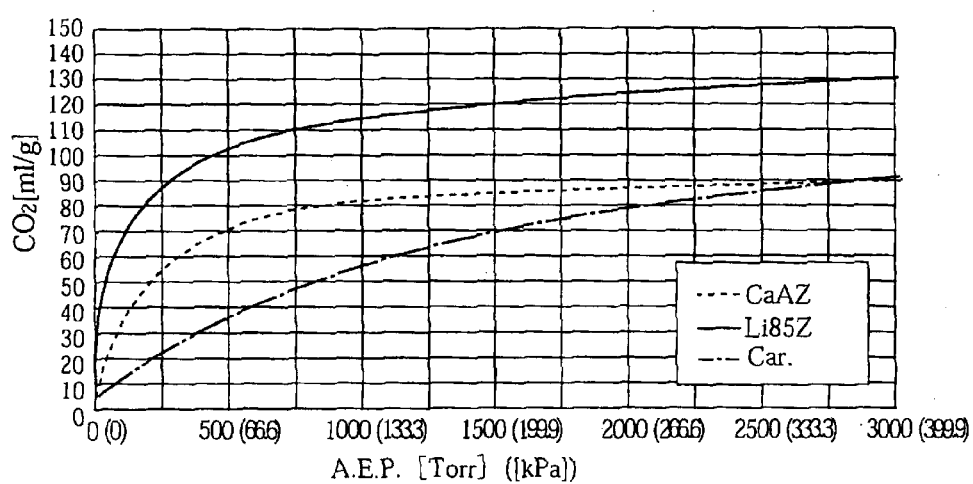
FIG. 17 is a graph showing adsorption characteristics of prior art adsorbents for carbon dioxide.

According to the experiments by the inventors of the present invention, the adsorption isotherm (25° C.) of zeolite (with lithium-exchange ratio of no less than 95%) according to the present invention becomes as shown in the graph of FIG. 14. This graph is obtained by adding the adsorption isotherm of the zeolite according to the present invention to the graph of FIG. 17 referred to before. As is clear from the graph of FIG. 14, in the case of the zeolite with 95% lithium-exchange ratio, the adsorption amount of carbon dioxide at the equilibrium adsorption pressure of 180 Torr is 52 ml/g while the adsorption amount of carbon dioxide at the equilibrium adsorption pressure of 1440 Torr is 116 ml/g. This indicates that 64(=116–52) ml/g of carbon dioxide gas can be removed by varying the equilibrium adsorption pressure in the range of 180 to 1440 Torr. This value is higher than those of the amount of carbon dioxide (37 ml/g and 48 ml/g) removed by the prior art adsorbent described with reference to FIG. 17.

Figure 15:
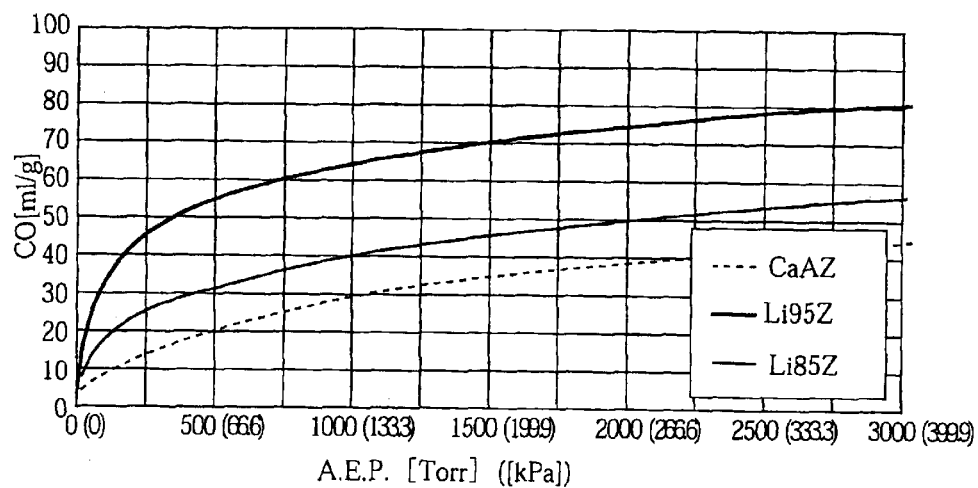
FIGS. 15 and 16 illustrate adsorption characteristics of a zeolite-based adsorbent according to the present invention and adsorbent characteristics of prior art zeolite-based adsorbents.
Figure 16:
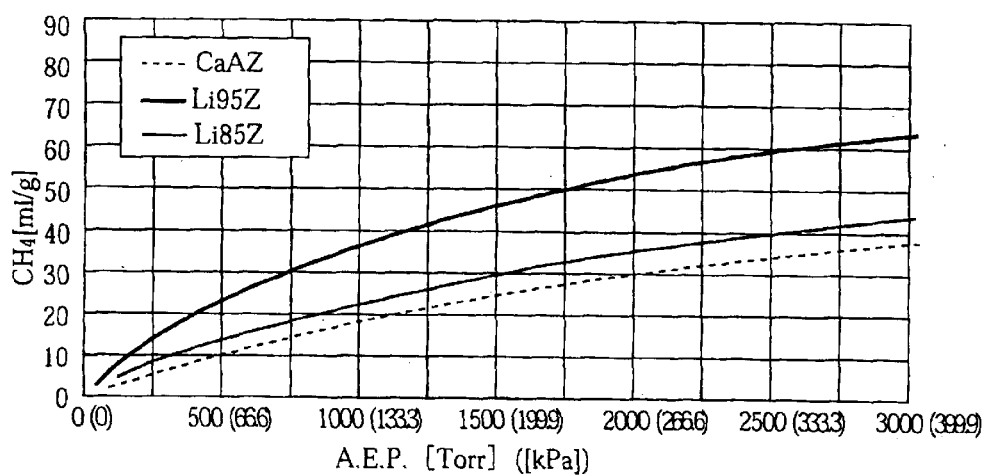

Similarly to conventional zeolite-based adsorbents, the zeolite with 95% lithium-exchange ratio according to the present invention is effective for removing carbon monoxide gas or nitrogen gas. The graph of FIG. 15 shows the adsorption isotherm (25° C.) of three kinds of zeolite-based adsorbents for carbon monoxide gas. As is clear from the graph, when the zeolite (with 95% lithium-exchange ratio) according to the present invention is used, carbon monoxide gas can be effectively removed by varying the partial pressure of monoxide in the range of 0.001 MPa (7.5 Torr) to 0.008 MPa (60 Torr). FIG. 16 is a graph showing the adsorption isotherm (25° C.) of the three kinds of zeolite-based adsorbents for methane gas.

As described above, both of carbon dioxide and carbon monoxide can be removed in the PSA process by the use of 95% lithium-exchange ratio zeolite having a faujasite structure. Since only a single kind of adsorbent is used, the size of the entire apparatus is prevented from unduly increasing. According to the present invention, the lithium-exchange ratio is not limited to 95%, but may be any value in the range of 95 to 100%.

The zeolite with 85% lithium-exchange ratio and that with 95% lithium-exchange ratio which have adsorption characteristic as shown in FIG. 14 can be obtained in the following manner.

For preparing a lithium-exchange zeolite, zeolite having a faujasite structure with a Si/Al ratio of 1 is first prepared. Specifically, solution of sodium/potassium aluminate and solution of sodium silicate are mixed homogeneously. After maturing at 50° C. for 30 hours, the mixed solution is crystallized at 95° C. for three hours. Subsequently, after undergoing filtration, the crystal is washed with distilled water, dried at 80° C. and baked at 550° C. for two hours. As a result, zeolite having a faujasite structure and a Si/Al ratio of 1 is obtained.

As the solution of sodium/potassium aluminate, use is made of one prepared by dissolving 15.6 g of gibbsite-type alumina trihydrate in a solution containing 100 ml of water, 33.68 g of sodium hydroxide pellets and 17.92 g of potassium hydroxide pellets at 100–115° C. followed by cooling the solution to 20° C. and making up for water lost by evaporation through the dissolution. As the sodium silicate solution, use is made of one prepared by dissolving 47.05 g of sodium silicate ($SiO_2/Na_2O=25.5:7.75$) in 100 ml of water.

After the zeolite thus obtained is immersed in lithium chloride solution for ion-exchange, the ion-exchanged material is washed with dilute solution of lithium hydroxide. To obtain zeolite with 85% lithium-exchange ratio, the combined operation of ion exchange and washing is repeated twice using lithium chloride solution having a concentration of 3M. To obtain zeolite with 95% lithium-exchange ratio, the combined operation of ion exchange and washing is repeated three times using lithium chloride solution having a concentration of 4M.

For lithium-exchange zeolite obtained in this way, the lithium-exchange ratio is calculated by $100=Li_2O/(Li_2O+Na_2O)$. That is, the ion-exchange ratio is represented by the ratio of the number of metal ions actually exchanged with Li ions to the number of metal ions capable of being replaced with Li ions.

A comparison is given below between the case where a 95% lithium-exchange zeolite is solely used as the adsorbent and the case where a Ca A-type zeolite and a carbon-based adsorbent are used as adsorbents.

EXAMPLE A

In Example A, the cycle consisting of the steps shown in the table of FIG. 13 was repeated by the separation apparatus X" as shown in FIG. 11 under the conditions described below.

One liter of adsorbent was loaded in each of the adsorption towers A, B and C. As the adsorbent, use was made of zeolite with 95% lithium-exchange ratio (having a faujasite structure with a Si/Al ratio of 1).

Material gas having a composition (by volume) consisting of 75% hydrogen gas, 24% carbon dioxide gas and 1% carbon monoxide gas was supplied to an adsorption tower during adsorption at 0.5 $Nm^3/hr$. The material gas maybe obtained by steam-reforming a hydrocarbon-based compound. Alternatively, the material gas may be obtained by steam-reforming a hydrocarbon-based compound followed by conversion of carbon monoxide contained in the reformed gas (thereby reducing the content of carbon monoxide)

In each of the adsorption towers A, B and C, the final pressure during the adsorption step and that during the desorption step were set to 0.8 MPa and atmospheric pressure, respectively. Each of the steps shown in the table of FIG. 13 was performed for 300 seconds.

As a result, 0.28 $Nm^3/hr$ of hydrogen gas was obtained as product gas. The recovery rate of hydrogen gas was 75%.

EXAMPLE B

In Example B, the cycle consisting of the steps shown in the table of FIG. 13 was repeated by the separation apparatus X" under the conditions described below.

A Ca-exchange A-type zeolite (Tradename:Zeolum, available from TOSOH CORPORATION) for carbon monoxide removal and a carbon-based zeolite (Tradename:CMS, available from Carbo Tech Aktivekohlen GmbH) for carbon dioxide removal are loaded in each of the adsorption towers A–C at a ratio of 50:50 by volume to be one liter in total. The material gas was supplied at 0.28 $Nm^3/hr$.

As a result, 0.14 $Nm^3/hr$ of hydrogen gas was obtained as product gas. The recovery rate of hydrogen gas was 67%.

As will be understood from the above, when the 95% lithium-exchange zeolite is solely used (Example A), the recovery of hydrogen gas is higher than in the case where two kinds of adsorbents are used (Example B) for removing carbon monoxide and carbon dioxide. Further, the amount of supplied material gas in the method of Example A is more than that in the method of Example B. Therefore, the method of Example A can remove carbon dioxide more effectively than the method of Example B (prior art), and can be suitably utilized not only for removing carbon monoxide but for removing carbon dioxide. Therefore, the amount of adsorbent to be used can be reduced.

The present invention being thus described, it is apparent that the same may be varied in many ways. Such variations should not be regarded as a departure from the spirit and scope of the present invention, and all such modifications as would be obvious to those skilled in the art are intended to be included within the scope of the following claims.

What is claimed is:

1. A method for separating hydrogen gas from material gas using a plurality of adsorption towers each of which is loaded with an adsorbent and is provided with a product gas outlet, the method comprising:

an adsorption step for adsorbing an unnecessary gas component contained in the material gas by the adsorbent for outputting hydrogen-rich product gas through the product gas outlet;

a decompression step for reducing pressure in an adsorption tower;

a desorption step for desorbing the unnecessary gas component from the adsorbent;

a cleaning step for cleaning the adsorption tower by introducing cleaning gas into the adsorption tower; and a pressurizing step for raising pressure in the adsorption tower;

one cycle comprising the adsorption step, the decompression step, the desorption step, the cleaning step and the pressurization step being repeated;

wherein the decompression step includes introducing gas remaining in the adsorption tower into a selected adsorption tower as at least a part of the cleaning gas, the remaining gas being introduced in an amount 2 to 7 times a volume of the adsorbent loaded in the selected adsorption tower as converted into volume at common temperature and under atmospheric pressure.

2. The method according to claim 1, wherein the cleaning step includes an additional cleaning step performed by introducing a part of the product gas obtained from an adsorption tower undergoing the adsorption step as another part of the cleaning gas.

3. The method according to claim 1, wherein the cleaning step in said one cycle includes a first cleaning step and a second cleaning step performed after the first cleaning step, the decompression step in said one cycle including a first decompression step and a second decompression step performed after the first decompression step, the first and the second decompression steps being performed by discharging a part of the remaining gas through the product gas outlet.

4. The method according to claim 3, wherein a plurality of adsorption towers including a first adsorption tower, a second adsorption tower, and a third adsorption tower are present, the first cleaning step in the first adsorption tower being performed by introducing therein a part of the remaining gas discharged from the second adsorption tower during the second decompression step through the product gas outlet of the first adsorption tower as a first part of the cleaning gas, the second cleaning step in the first adsorption tower being performed by introducing therein a part of the remaining gas discharged from the third adsorption tower during the first decompression step through the product gas outlet of the first adsorption tower as a second part of the cleaning gas.

5. The method according to claim 4, wherein the cleaning step includes a third cleaning step performed by introducing a part of the product gas obtained from an adsorption tower undergoing the adsorption step as a third part of the cleaning gas.

6. The method according to claim 5, wherein, in said one cycle, the decompression step, the desorption step, the first cleaning step, the desorption step, the second cleaning step and the third cleaning step are performed in the mentioned order in each of the adsorption towers.

7. The method according to claim 1, wherein maximum pressure in the adsorption step lies in a range of 0.2 to 3.6 MPa (absolute pressure), whereas minimum pressure in the desorption step lies in a range of atmospheric pressure to 0.15 MPa (absolute pressure).

8. The method according to claim 1, wherein the material gas contains carbon dioxide gas as the unnecessary gas component.

* * * * *